United States Patent
Nelson et al.

(10) Patent No.: US 10,922,726 B1
(45) Date of Patent: Feb. 16, 2021

(54) INTELLIGENT VEHICLE REPAIR ESTIMATION SYSTEM

(71) Applicant: CCC INFORMATION SERVICES INC., Chicago, IL (US)

(72) Inventors: Ronald Nelson, Los Angeles, CA (US); Sean Fitzgerald, Cerritos, CA (US); Jesse Horski, Lakewood, CA (US)

(73) Assignee: CCC INFORMATION SERVICES INC., Chicago, IL (US)

( * ) Notice: Subject to any disclaimer, the term of this patent is extended or adjusted under 35 U.S.C. 154(b) by 0 days.

(21) Appl. No.: 16/407,350

(22) Filed: May 9, 2019

(51) Int. Cl.
  *G06Q 30/00* (2012.01)
  *G06Q 30/02* (2012.01)
  *G06Q 10/00* (2012.01)
  *G06Q 40/08* (2012.01)
  *G06N 5/04* (2006.01)

(52) U.S. Cl.
  CPC ......... *G06Q 30/0283* (2013.01); *G06N 5/048* (2013.01); *G06Q 10/20* (2013.01); *G06Q 40/08* (2013.01)

(58) Field of Classification Search
  CPC .......................... G06Q 30/0283; G06Q 40/08
  See application file for complete search history.

(56) References Cited

U.S. PATENT DOCUMENTS

| | | | |
|---|---|---|---|
| 9,111,264 B2 * | 8/2015 | Coard | G06Q 10/20 |
| 10,360,601 B1 * | 7/2019 | Adegan | G06Q 30/0611 |
| 2004/0073434 A1 * | 4/2004 | Volquardsen | G06Q 10/20 705/305 |
| 2006/0293906 A1 * | 12/2006 | Wilson | G06Q 10/20 705/304 |

(Continued)

OTHER PUBLICATIONS

Hellyar, "CCC Introduces the World's First Artificial Intelligence Estimating Tool", CCC Information Services Inc., 2018, https://www.cccis.com/2018/12/03/ccc-introduces-worlds-first-artificial-intelligence-estimating-tool/, 2 pages.

(Continued)

*Primary Examiner* — Scott C Anderson
(74) *Attorney, Agent, or Firm* — Marshall, Gerstein & Borun LLP

(57) ABSTRACT

Intelligent vehicle repair estimating techniques include an image processing component that extracts image attributes from one or more images of a damaged vehicle, and utilizes the attributes to predict an initial set of parts that are globally-identified. Based on a jurisdiction associated with the damaged vehicle, the initial set of parts is transformed into a set of jurisdictionally-based repairs (e.g., parts, labor operations, time intervals, costs, etc.), which may be included in a draft vehicle repair estimate. An estimate refinement component iteratively modifies/refines the draft estimate using a machine-only loop nested within a larger human-machine loop, where system-generated modifications are incrementally incorporated into the draft within the smaller loop, and user-generated modifications are incrementally incorporated into the draft within the larger loop. User-facing draft estimates may be of a WYSIWYG format, and draft estimate contents and/or guidance annotations are updated, via the nested loops, in-line upon each individual/unitary user modification.

22 Claims, 6 Drawing Sheets

(56) References Cited

U.S. PATENT DOCUMENTS

| | | | | |
|---|---|---|---|---|
| 2013/0268298 A1* | 10/2013 | Elkins | ............... | G06Q 40/08 |
| | | | | 705/4 |
| 2014/0122130 A1* | 5/2014 | Kelly | ............... | G06Q 10/087 |
| | | | | 705/4 |
| 2015/0206357 A1 | 7/2015 | Chen et al. | | |
| 2015/0317739 A1* | 11/2015 | Lawlor | ............ | G06Q 30/0283 |
| | | | | 705/4 |
| 2017/0148102 A1 | 5/2017 | Franke et al. | | |

OTHER PUBLICATIONS

Huetter, "Insurers testing CCU's A.I. Smart Estimate; product goes on sale early next year", Driven Communications Inc., 2018, https://www.repairerdrivennews.com/2018/12/04/insurers-testing-cccs-a-i-smart-estimate-product-goes-on-sale-next-year/, 8 pages.

Verlen et al., "Putting the AI in claims", PowerPoint slides presented in Boston on Dec. 3, 2018, 41 pages.

\* cited by examiner

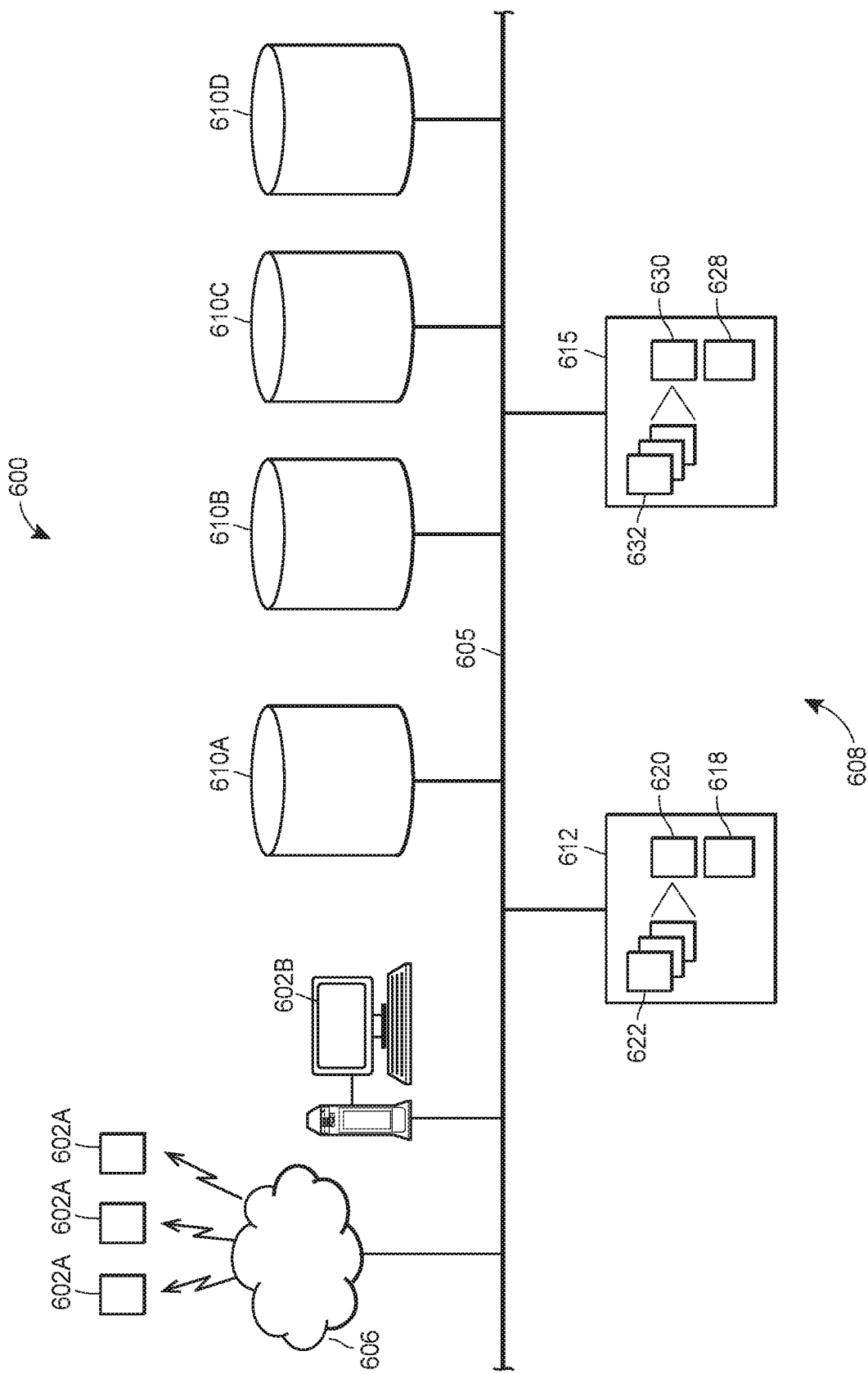

INTELLIGENT VEHICLE REPAIR ESTIMATION SYSTEM

TECHNICAL FIELD

This disclosure relates to an intelligent vehicle repair estimation system that processes images of a damaged vehicle to intelligently generate an estimate for repairing the vehicle.

BACKGROUND

Currently known computer-assisted techniques for generating estimates for vehicle repair typically involve a human user, such as an insurance adjuster or claims handler, who views the damaged vehicle and/or images of the damaged vehicle and enters, into an electronic template or form, data for parts and/or labor operations that the adjuster feels are needed for repairing the vehicle. For example, if the adjuster sees a dent in a car door, the adjuster may select (e.g., may click on) a line entry for a replacement door part within the electronic estimation template to thereby add the replacement door part to the estimate, and also may select or click on line entries for painting and/or blending labor operations related to the door to thereby add such labor operations to the estimate. When the adjuster is satisfied with the entered data, the adjuster instructs the electronic estimate template to calculate the total estimated cost of repair based on the selected line entries. Upon review of the calculated draft estimate shown within the electronic template, the adjuster may make additional changes to various parts and/or labor operations that the adjuster feels are necessary to refine the estimate, and subsequently may instruct the electronic estimate template to update the calculation of the total estimated cost of repair based on the changes. This cycle continues until the adjuster is satisfied with the electronic estimate template.

Thus, currently known electronic estimate templates or forms simply provide a comprehensive menu of possible parts and labor operations from which the insurance adjuster selects to add to an estimate for repairing a damaged vehicle, and calculate an estimate cost of repairing the vehicle based on the user's selections. As such, currently known electronic estimate templates or forms rely heavily on the insurance adjuster's knowledge as to which parts and/or labor operations correspond to which types of visually detectable damage, as well as the insurance adjuster's personal knowledge as to which parts and/or labor operations are in accordance with any jurisdictional regulations (e.g., hazardous waste disposal, emission standards, etc.). Accordingly, resulting estimates may suffer from contextual inaccuracies, omissions, inconsistencies, and/or other types of errors which may or may not be detected by the adjuster and, when detected, must be corrected. Further, as selections of parts and/or labor operations are manually indicated, the maximum speed of generating an electronic estimate for vehicle repair is limited by human ability.

SUMMARY

The present disclosure describes intelligent estimating systems, methods, and techniques that generate estimates for repairing damaged vehicles in a more robust, accurate, and contextually-complete manner than that of currently known computer-assisted estimating templates or forms, as well as greatly improves the speed for generating such estimates over the currently known electronic templates or forms. The systems, methods, and techniques described herein may utilize or include a front-end image processing portion coupled to a back-end hybrid estimate completion portion, where each portion may be individually utilized without the other portion to provide respective improvements to electronic estimating techniques. However, by utilizing both portions in combination, maximum improvements in accuracy, completeness, and processing speed in electronic vehicle repair estimating may be achieved.

In an example embodiment, a method includes obtaining, via a network interface of an image processing system, one or more images of a damaged vehicle, and image processing the one or more images to determine a set of image attributes indicative of respective locations and types or content of damages to the vehicle depicted within the one or more images. The method also includes automatically determining, by a parts prediction engine of the image processing system and based on the set of image attributes, an initial set of parts that are associated with repairing the damaged vehicle and, for each of at least some parts included in the initial set of parts, at least one of: a respective likelihood of part replacement or a respective likelihood of part repair for repairing the damaged vehicle. For example, the initial set of parts, any part replacement likelihoods, and any part repair likelihoods of the initial set of parts may be automatically determined based on a statistical analysis of historical data associated with repairing vehicles and/or a machine learning model generated based on the historical data associated with repairing vehicles, where the historical data includes image attribute data of a plurality of historical images of damaged vehicles, respective indications of parts that were associated with repairing the damaged vehicles depicted in the historical images, and a plurality of other attributes corresponding to the damaged vehicles depicted in the historical images.

Additionally, the method includes automatically transforming, by an estimate generation engine of the image processing system, the indication of the initial set of parts, any part replacement likelihoods associated with the initial set of parts, and any part repair likelihoods associate with the initial set of parts into an estimate for repairing the damaged vehicle, where the estimate includes (i) an indication of a jurisdictionally-based set of parts corresponding to a jurisdiction associated with the damaged vehicle, (ii) for each of at least some parts included in the jurisdictionally-based set of parts, respective indications as to whether each jurisdictionally-based part is to be repaired or replaced, and (iii) an indication of a set of labor operations that are predicted as being needed to repair the damaged vehicle. The method additionally includes providing, via an output interface of the image processing system to a recipient, the indication of the jurisdictionally-based set of parts corresponding to the damaged vehicle.

In an example embodiment, a system includes a database storing a listing of possible parts for repairing vehicles and an indication of a respective jurisdiction corresponding to each possible part; one or more memories storing a plurality of routines including an image processing routine, a parts prediction routine, and an estimate generation routine; one or more interface modules; and one or more processors interfacing with the database, the one or more memories, and the one or more interface modules. The one or more processors are configured to execute the plurality of routines to cause the system to: obtain, via the one or more interface modules, one or more images of a damaged vehicle; and image process, via the image processing routine, the one or more images to determine a set of image attributes indicative of respective locations and content of damages to the vehicle depicted within the one or more images. Further, the one or more processors are configured to execute the plurality of routines to cause the system further to: determine, via the parts prediction routine and based on the set of image attributes, an initial set of parts associated with the damaged vehicle, and, for each part of at least some of the initial set of parts, at least one of: a respective likelihood of part replacement or a respective likelihood of part repair for repairing the damaged vehicle. The determination may be based on a machine learning model generated based on historical data associated with repairing vehicles and/or one or more statistical analyses of the historical data, where the historical data includes image attribute data of a plurality of historical images of damaged vehicles, respective indications of parts associated with repairing the damaged vehicles depicted in the historical images, and a plurality of other attributes corresponding to the damaged vehicles depicted in the historical images.

Still further, the one or more processors are configured to execute the plurality of routines to cause the system further to: determine, via the estimate generation routine and based on the indication of the initial set of parts, the part replacement likelihoods, the part repair likelihoods, and the listing of possible parts, an estimate for repairing the damaged vehicle, where the estimate includes (i) a jurisdictionally-based set of parts corresponding to a jurisdiction associated with the damaged vehicle, (ii) for each part of at least some of the jurisdictionally-based set of parts, a respective indications as to whether each jurisdictionally-based part is to be repaired or replaced, and (iii) an indication of a set of labor operations that are predicted as being needed to repair the damaged vehicle. The one or more processors are configured to execute the plurality of routines to cause the system further to transmit, via the interface module to a recipient, the estimate for repairing the damaged vehicle.

In an example embodiment, a system comprises an intelligent interceptor engine coupled to a user interface. The intelligent interceptor engine comprises one or more memories storing computer-executable instructions that, when executed by one or more processors of the system, cause the intelligent interceptor engine to: (a) obtain an initial draft estimate for repairing a damaged vehicle, the initial draft estimate including a set of fields, and each field included in the set of fields corresponding to a respective part or labor operation associated with repairing the damaged vehicle; and (b) execute one or more iterations of an automated loop with respect to the initial draft estimate, where each iteration of the automated loop includes: analyzing a current draft estimate to determine whether or not any system-generated modifications are to be made to the current draft estimate; and when at least one system-generated modification is to be made to the current draft estimate, applying the at least one system-generated modification to the current draft estimate and causing one or more values of the current draft estimate to be updated based on the applied at least one system-generated modification, thereby updating the current draft estimate, and subsequently initiating a next iteration of the automated loop with respect to the updated current draft estimate.

The computer-executable instructions, when executed by the one or more processors of the system, cause the intelligent interceptor engine further to: (c) when the automated loop determines that no additional system-generated modifications are to be made to the current draft estimate, display the current system-modified draft estimate at the user interface; (d) obtain, via the user interface, a user-generated modification in response to the display of the current system-modified draft estimate; and (e) apply the user-generated modification to the current system modified draft estimate, thereby generating a user-modified draft estimate, and subsequently initiate another iteration of the automated loop with respect to the user-modified draft estimate.

In an example embodiment, a method comprises: (a) receiving, at an intelligent interceptor engine, an initial draft estimate for repairing a damaged vehicle, where the initial draft estimate includes a set of fields, and each field included in the set of fields corresponds to a respective part or labor operation; and (b) executing one or more iterations of an automated loop with respect to the initial draft estimate, where each iteration of the automated loop includes: (i) analyzing a current draft estimate to determine whether or not any system-generated modifications are to be made to the current draft estimate; and (ii) when at least one system-generated modification is to be made to the current draft estimate, applying the at least one system-generated modification to the current draft estimate and causing one or more values of the current draft estimate to be updated based on the applied at least one system-generated modification, thereby updating the current draft estimate, and subsequently initiating a next iteration of the automated loop with respect to the updated current draft estimate. The method further comprises: (c) when the automated loop determines that no additional system-generated modifications are to be made to the current draft estimate, presenting the current system-modified draft estimate at the user interface; (d) obtaining, via the user interface, a user-generated modification in response to the display of the current system-modified draft estimate; and (e) applying the user-generated modification to the current system modified draft estimate, thereby generating a user-modified draft estimate, and subsequently initiating another iteration of the automated loop with respect to the user-modified draft estimate.

In an example embodiment, a method is performed by a system including a user interface, an estimate calculation engine, and an intelligent interceptor engine, each of which comprises respective computer-executable instructions stored on one or more tangible, non-transitory computer-readable media and executable by one or more processors. The method includes (a) analyzing, by the intelligent interceptor engine, a draft estimate to determine whether or not any system-generated modifications are to be made to the draft estimate; (b) when at least one system-generated modification is to be made to the draft estimate determining, by the intelligent interceptor engine, the at least one system-generated modification, and applying the at least one system-generated modification to the draft estimate; (c) updating, by the estimate calculation engine, respective values of one or more fields included in the draft estimate to which the at least one system-generated modification has been applied, thereby generating a system-modified draft estimate, and initiating (a) with respect to the system-modified draft estimate; and (d) when no additional system-generated modifications are to be made to a current system-modified draft estimate, present, by the intelligent interceptor engine, the current system-modified draft estimate at a user interface.

BRIEF DESCRIPTION OF THE DRAWINGS

FIG. 6 depicts an example embodiment of the intelligent vehicle repair estimation system of FIG. 1.

DETAILED DESCRIPTION

Figure 1:
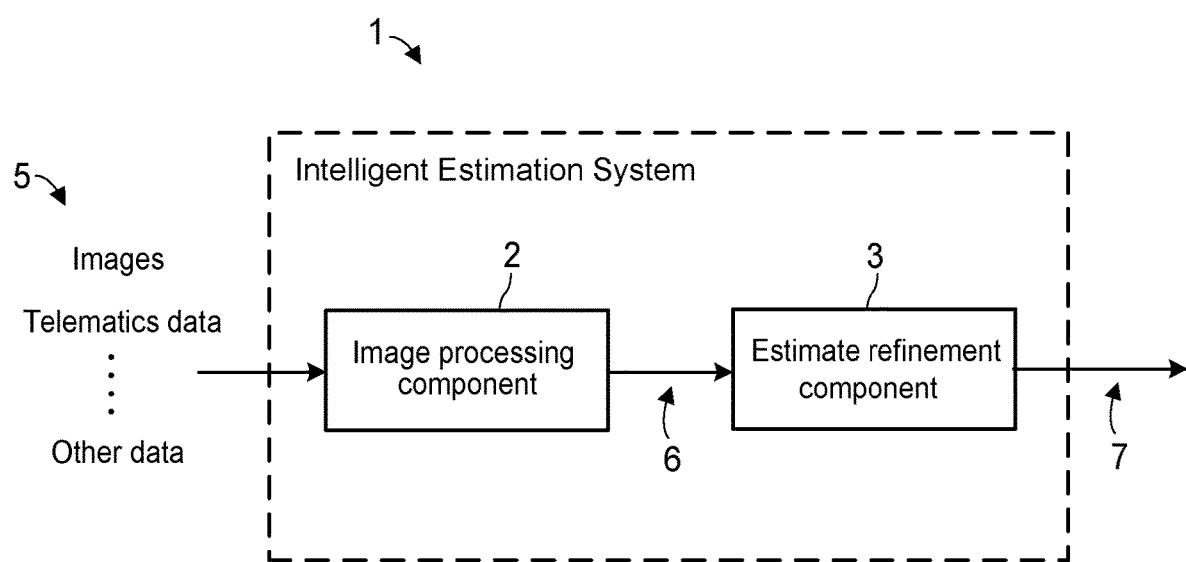
FIG. 1 includes a high level block diagram of an example intelligent estimation system that generates estimates for repairing damaged vehicles.

FIG. 1 includes a high level block diagram of an example intelligent estimation system 1 that intelligently generates estimates for repairing damaged vehicles. The system 1 includes a front-end image processing portion or component 2 coupled to a back-end estimate refinement portion or component 3. The front-end image processing portion 2 is interchangeably referred to herein as the "image processing portion," the "image processing component," and/or, as the front-end image processing portion 2 may be utilized in a standalone manner, the "image processing system." Similarly, the back-end estimate refinement portion 3 is interchangeably referred to herein as the "estimate refinement portion," the "estimate refinement component," and/or, as the back-end estimate refinement portion 3 may be utilized in a standalone manner, the "estimate refinement system."

The intelligent estimation system 1 may be implemented using a single computing device, or may be implemented using a plurality of networked computing devices, such as a server bank or cloud computing system. In some cases, at least a portion of the intelligent estimation system 1 is associated with an insurance carrier. In some cases, at least a portion of the intelligent estimation system 1 is associated with a repair facility. In some cases, the intelligent estimation system 1 is associated with a third party that is not an insurance carrier (e.g., does not directly sell or issue insurance policies) and that is not a repair facility (e.g., does not perform vehicle repairs), and may or may not be in communicative connection with a computing device associated with the insurance carrier and/or with a computing device associated with a repair facility.

Generally speaking, the image processing component 2 of the intelligent estimation system 1 ingests input data 5 corresponding to a damaged vehicle, where the input data 5 includes a set of images of the damaged vehicle. The input 5 ingested by the image processing component 2 may also include other types of data that correspond to the damaged vehicle, such as telematics data, incident facts, a vehicle build sheet, sensor data, diagnostics data, accident reports, agent and/or law enforcement notes, surveillance camera video, etc. The image processing component 2 operates on the input data 5 by utilizing one or more image processing and analytics techniques to thereby determine or predict an initial set of parts that are associated with repairing the damaged vehicle, e.g., parts which may be used to replace damaged parts, parts which may be repaired, etc. Further, the image processing component 2 transforms the predicted, initial set of parts into a predicted, jurisdictionally-based set of parts and a predicted set of labor operations associated with repairing the damaged vehicle. In some embodiments, the image processing component 2 also provides an indication of whether a jurisdictionally-based part is to be replaced or repaired, and/or a confidence level associated with each prediction (e.g., of parts, of whether parts are to be replaced or repaired, of labor operations, etc.). In some embodiments, the image processing component 2 generates a draft estimate 6 for repairing the damaged vehicle, where the draft estimate 6 indicates the predicted, jurisdictionally-based set of parts, whether or not parts are to be replaced or repaired, and labor operations associated with repairing the damaged vehicle, and optionally, one or more costs associated with the predicted parts and/or labor operations. As such, the image processing component 2 is interchangeably referred to herein as a "predictive" image processing portion, component, or system 2.

The estimate refinement component 3 of the intelligent estimation system 1 obtains a draft estimate 6 for repairing a damaged vehicle. As illustrated in FIG. 1, the estimate refinement component 3 obtains the draft estimate 6 from the image processing component 2; however, in other embodiments, the estimate refinement component 3 may obtain the draft estimate 6 from other sources, such as other estimating programs, a spreadsheet, a local or remote user interface, etc. The estimate refinement component 3 operates on the draft estimate 6 to automatically determine one or more system-generated modifications to the draft estimate, where the system-generated modifications may include entered values, additional fields, removal of fields, and the like, and the estimate refinement component 3 automatically updates the draft estimate based on the system-generated modifications, e.g., content updates, time interval updates, cost updates, and other updates of values included in the draft estimate. In such a manner, the estimate refinement component 3 iteratively, continually, incrementally, and automatically modifies, revises, and updates a draft estimate without human intervention or input, while assessing if and when human input is needed to augment a current revision of the draft estimate. Upon determining that human input is desired for a current revision of the draft estimate, the estimate refinement component 3 displays the current revision of the draft estimate at a local or remote user interface for user review and optional user-generated modification, which may include, for example, content modification and/or value modification. Each user-generated modification to a current revision of the draft estimate that is entered via the user interface is automatically processed by the estimate refinement component 3 to update the current revision of the draft estimate in accordance with the user-generated modification, after which the estimate refinement component 3 again automatically determines (e.g., iteratively, if necessary) any additional system modifications to the updated current revision are needed. In a sense, after the application of a system-generated modification or of a user-generated modification to a current version of the draft estimate, the estimate refinement component 3 intercepts any newly revised version of the draft estimate from being presented at the user interface and automatically determines and applies any additional system-generated modifications thereto, and updates or re-calculates any values (e.g., costs, time intervals, etc.) of the draft estimate. As such, and generally speaking, the estimate refinement component 3 provides an opportunity for human modification/input primarily (or, in some cases, only) for augmentation and/or customization purposes of system-modified draft estimates. Accordingly, the estimate refinement component 3 is interchangeably referred to herein as a "hybrid" and/or "iterative" estimate refinement portion, component, or system 3 of the intelligent estimation system 1. The hybrid estimate refinement component 3 may automatically perform hybrid human-machine modifications (e.g., by using nested loops, as is described elsewhere within this document) to continuously and incrementally revise and update a draft vehicle estimate, until the user indicates an approval of a current revision of the draft estimate. The approved draft estimate 7 may be provided to one or more recipients, such as a user interface, an application, a computing device, or another system (not shown in FIG. 1).

Figure 2:
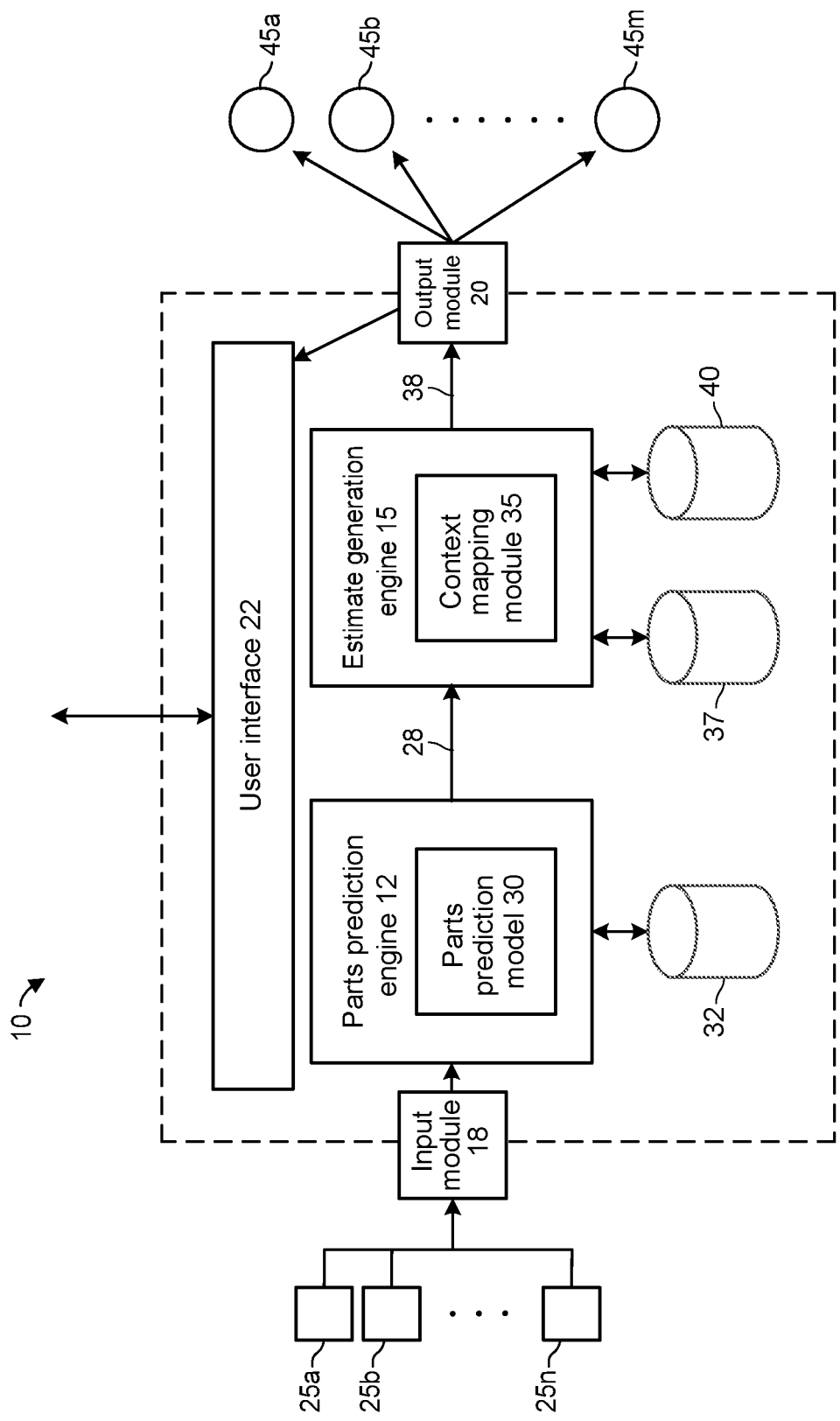
FIG. 2 is a high level block diagram depicting an example data flow through an image processing system that processes images of a damaged vehicle to determine parts that are associated with repairing the vehicle in various different jurisdictions.

FIG. 2 is a high level block diagram depicting an example data flow through an image processing system 10 that processes images of a damaged vehicle to determine parts that are associated with repairing the vehicle in various different jurisdictions. The image processing system 10 may be a stand-alone system, the image processing system 10 may be the predictive image processing component 2 of the intelligent estimation system 1, or the image processing system 10 may be included in another vehicle repair estimation system. As depicted in FIG. 2, the image processing system 10 includes a parts prediction engine 12 coupled to an estimate generation engine 15, and various interface modules, such as an input interface module 18, an output interface module 20, a user interface module 22, and/or one or more other interface modules (not shown). In an embodiment, each component 12, 15, 18, 20, 22 of the system 10 may comprise a respective set of computer-executable instructions stored on one or more tangible, non-transitory computer-readable storage media, and one or more processors may execute each set of instructions to cause the system 10 to perform at least the features, functionalities, techniques, and capabilities described herein. In some embodiments, at least a respective portion of one or more of the components 12, 15, 18, 20, 22 may comprise firmware and/or hardware. The system 10 may include other components that are not illustrated in FIG. 2, such as one or more displays, user interfaces, input interfaces, output interfaces, and/or network interfaces, other computer-executable modules, etc.

As shown in FIG. 2, the image processing system 10 obtains one or more images 25a-25n of a damaged vehicle via its input interface module 18 and provides the images 25a-25n to the parts prediction engine 12. The parts prediction engine 12 images processes the images 25a-25n to extract or determine image attributes, and provides the extracted or determined attributes as inputs into a parts prediction model 30. The parts prediction model 30 operates on the attributes of images 25a-25n to thereby determine an initial set of parts 28 that are associated with repairing the damaged vehicle, e.g., parts that are to be replaced, and/or parts that are to be repaired. The initial set of parts 28 may be indicated, for example, by a set of Global Identifiers or Global IDs of the parts 28. Global IDs, as utilized herein, may respectively indicate particular parts in a categorical or general sense commonly across jurisdictions. That is, Global IDs are not jurisdiction-specific and do not identify parts by on a per-unit or individual basis, such as by SKU (Stock Keeping Unit), manufacturer-specific part identifier, or any other type of per-unit identifier. Rather, a Global ID is a unique categorical or generalized identifier. For example, a unique Global ID may indicate a categorical or generalized "bumper" part, irrespective of whether or not the bumper is a simple assembly including fourteen individually-identifiable parts or the bumper is a more complex assembly including thirty-six individually-identifiable parts; whether the parts of the bumper assembly are manufactured by Manufacturer A, Manufacturer B, Manufacturer C, or some combination thereof; etc. In another example, a unique Global ID may identify a categorical or generalized "front grille" part, irrespective of whether or not a replacement of a front grille of a damaged vehicle requires a single grille or multiple grilles.

The one or more images 25a-25n obtained by the system 10 may be of any suitable digital format. For example, one or more images 25a-25n may be of a bitmap or vector format, such as Joint Photographic Experts Group (JPEG), Graphics Interchange Format (GIF), Portable Networks Graphics (PNG), Portable Document Format (PDF), Encapsulated Postscript (EPS), etc. The parts prediction engine 12 may analyze, via various image processing techniques, the obtained images 25a-25n to extract, determine, create, and/or or generate one or more image attributes indicative of respective contents or types of damages to the vehicle, and indicative of associated locations of the damages. An image attribute may include a plurality of image attribute values (e.g., discrete or continuous numerical values) for a plurality of image attribute types that are indicative of at least a portion of the locations and contents/types of damages to the vehicle. By way of example and without limitation, image attributes may include image attribute types corresponding to locations of image features (e.g., point, edge, corner, or ridge features), dimensions of image features (e.g., length, width, or radius), colors of points or areas in an image, textures of points or areas in an image, entropies of an image, contrasts of an image, lighting orientations, locations or properties of shadows in an image, etc. Image attributes may also include image attribute types corresponding to a content or a type of damages, e.g., scratches, ripples, tears, dents, punctures, rips, holes, missing parts, misalignments, etc. Notably, within the parts prediction engine 30, image attributes that correspond to damage location and/or damage type/content relating to parts of the damaged vehicle, as determined by analyzing the obtained images 25a-25n, may refer to the related parts via their Global IDs, and not via their individual, per-unit part identifiers. As such, input into the parts prediction model 30 may include, at least in part, Global IDs corresponding to the determined image attributes of the images 25a-25n.

In some implementations, the image processing system 10 includes an image selector engine that selects the images 25a-25n from a plurality of images of the damaged vehicle (not shown in FIG. 2) for ingestion by the input module 18. Selection criteria may include, for example, a desired number of images, image quality, portions and/or perspective views of the damaged vehicle that are displayed within the images, and the like. For example, the image selector engine may select only a single image to provide to the input module 18, or the image selector may select multiple images to provide to the input module 18.

In some implementations, prior to ingestion by the input module 18, the images 25a-25n may be tagged, labeled, or otherwise annotated (such as with metadata) so that certain image information may be more easily deduced. The added image information may include, by way of example, portions of the vehicle included in an image (passenger-side left, front, back, drivers-side back, etc.), a timestamp representing when the image was captured, an identification of the vehicle (license plate, insurance claim policy number, VIN number, etc.). A human such an adjuster may provide some of the annotated information, and/or a computing device (such as the image capture device) may provide some of the annotated information. In some cases, the tags, labels, or other annotations may be input into the parts prediction model 30 in conjunction with the determined image attributes of the images 25a-25n.

The parts prediction model 30 operates on the image attribute data indicative of the contents/types and locations of damages to the vehicle (and optionally also operates on the other data associated with the input images 25a-25n) by utilizing one or more analytics techniques to thereby generate a prediction, determination, or identification of an initial set of parts 28 that are associated with repairing the damaged vehicle depicted in the images 25a-25n. For example, the parts prediction model 30 may utilize one or more machine learning algorithms, statistical algorithms, rule-based logic techniques, and/or historical claim analyses in furtherance of analyzing the image attribute data. Based on the inputs (e.g., the independent variables of the model 30), the parts prediction model 30 determines one or more outputs (e.g., dependent variables of the model 30), including the predicted, identified, determined, generated, and/or created initial set of parts 28 corresponding to the damage indicated by the image attributes (and optionally, the other data that was input into the model 30). The parts 28 that are identified or predicted to be needed by the parts prediction model 30 are referred to by their respective Global IDs.

In an embodiment, the parts prediction model 30 may have been generated a priori (or, in some cases, may be generated in real-time or on-demand upon reception of the images 25a-25n) based on one or more data analysis techniques such as principal components analyses, cluster analyses, linear regression analyses, multivariate regression analyses such as the Ordinary Least Squares algorithm, a logistic regression analysis, a K-th nearest neighbor (k-NN) analysis, a K-means analysis, a Naïve Bayes analysis, another suitable or desired predictive data analysis, statistical algorithms, one or more machine learning algorithms, or some combination thereof performed on historical data 32 related to repairing damaged vehicles to thereby determine which image attributes are more closely correlated with which various parts that were actually needed to repair vehicle damage, and whether those parts were replaced or repaired. As shown in FIG. 2, the historical data 32 related to repairing damaged vehicles is stored in a data storage device, system, or store which may be accessible to or included in the image processing system 10 and/or the parts prediction engine 12. Notably, the historical data 32 that is utilized to generate and train the parts prediction model 30 refers to parts via their respective Global IDs rather than by their respective individual, per-unit identifiers.

In addition to image attributes of historical images of damaged vehicles and Global IDs of parts that were utilized to repair the damaged vehicles depicted within the historical images, the historical data 32 that is utilized to generate and train the parts prediction model 30 may additionally include, for example, the historical images, vehicle repair cost data, repair time data, re-inspection data, insurance claim data, telematics data, vehicle build sheets, diagnostic trouble codes, environmental data obtained from external sensors (e.g., street camera, radar guns, etc.), a universal parts registry, a registry of labor costs, registry repair time, etc. for various types of damage and/or previous repairs to vehicles of various makes, models, years, year ranges, types, etc. Still further, the historical data 32 may include: insurance policy number; insurance company or carrier holding the insurance policy; identification of insured party; vehicle owner name, street, city and state address, zip code; location (e.g., state and zip code) where vehicle loss or incident occurred; zip code where vehicle is garaged/stored; vehicle driver name, age, street, city and state address, zip code; Vehicle Identification Number (VIN); vehicle make, model, model year, country of origin, manufacturer; vehicle type or body style (e.g., sedan, coupe, pick-up, SUV, wagon, van, hatchback, convertible, etc.); vehicle odometer reading; vehicle engine size, color, number of doors; vehicle ownership status (e.g., leased, owned outright, short term rental, etc.); age of vehicle; condition of vehicle; settlement amount between insurance company and repair facility; payout amount (if any) to insured party or party holding the insurance policy; loss or incident date; weather or road conditions at time or location of loss//incident/accident; vehicle appraisal inspection location and responsible adjustor; points of impact; vehicle drivable condition; airbag deploy condition; qualitative severity of damage; quantitative severity of damage; velocity of vehicle just prior to impact(s); change in velocity of vehicle due to impact(s); vehicle dimension score; vehicle repair score; initial estimate; estimate or prediction of settlement at FNOL (First Notice of Loss); estimate from another repair facility or party; one or more additional estimates and indications of when during the claim settlement process the additional estimates occurred; occurrence of one or more re-inspections; cost to perform each re-inspection; revised estimate after re-inspection and corresponding repair work/ parts; occurrence of one or more supplements paid from insurance company to repair facility; monetary amount of each supplement; level of desired target quality of repair; level of actual quality of repair; deductible; towing and storage costs; labor hours and costs for replacement and/or repair; type of labor (e.g., sheet metal, mechanical, refinish, frame, paint, structural, diagnostic, electrical, glass, etc.); type of part (e.g., OEM (Original Equipment Manufactured), new, recycled, reconditioned, aftermarket, etc.); individual identifier of part; cost of part; paint costs; tire costs; hazardous waste disposal costs; other disposal costs; repair facility name, location, state, zip code; drivability indicator; and/or other data related to damage to vehicles and corresponding repairs.

Thus, as described above, some of the historical data 32 may include other types of data that is indicative of damaged vehicles; repairs to the damaged vehicles; drivers, owners, or insured parties of the vehicles; and/or the impacts, collisions, or damages necessitating repairs to the vehicles. At least some of these other types of data that are included in the historical data 32 may be obtained for the subject damaged vehicle, and these obtained, other types of data may be input into the parts prediction model 30 in conjunction with the image attributes gleaned from the set of images 25a-25n of the subject damaged vehicle to thereby determine or predict the set of needed parts 28 for the damaged vehicle.

The input parameters to the parts prediction model 30 (e.g., image attribute data indicative of damage types/contents and locations), and optionally other data related to the damaged vehicle) may be tuned or weighted based on historical data, artificial intelligence, and/or a user's selections. Based on the inputted data and any associated weights, the parts prediction model 30 generates an initial set of parts 28 that are predicted to be associated with repairing the vehicle, where each predicted part is indicated by its respective Global ID. Further, in some embodiments, the parts prediction model 30 may generate one or more respective confidence levels or scores for one or more of the parts 28, where the one or more respective confidence levels or scores may be indicative of a likelihood of the part being associated with repairing the vehicle, a likelihood of the part being replaced in order to repair the vehicle, and/or a likelihood of the part being repaired in order to repair the vehicle. In some implementations, the parts prediction model 30 may generate an overall confidence level or score corresponding to the entire initial set of parts 38.

In some embodiments, the parts prediction model 30 is re-trained or updated to account for additional data (e.g., additional image attribute data and other data related to repairing damaged vehicles) that has been added to the historical data store 32. Training or updating may be triggered periodically at a given interval, such as weekly, monthly or quarterly. Training or updating may be triggered when a particular quantity of additional data points have been added to the historical data store 32. In some embodiments, prior to training, some portion of the historical data is deleted from the data store 32, such as discontinued parts, make/model/years of vehicles that are less likely to be on the road, etc. Additionally or alternatively, training or updating may be triggered by a user request.

Further, in some embodiments, other characteristics of the damaged vehicle may be determined by the parts prediction model 30 based on the inputs to the model 30, where the other determined characteristics may include, for example, the vehicle's make, model, and year or year-range; VIN; license plate number and issuing jurisdiction; vehicle body type; etc. Additionally or alternatively, at least some of the other characteristics of the damaged vehicle may be automatically determined, based on the images 25a-25n, by other models or modules of the parts prediction engine 12 (not shown), and/or via configuration preferences or boundaries, which may have been received a priori via the user interface 22 of the system 10.

Turning now to the estimate generation engine 15 of the image processing system 10, the estimate generation engine 15 obtains the initially predicted set of parts 28 and utilizes a context mapping module 35 to generate or output a jurisdictionally-based set of repairs 38 that are determined or predicted to be needed to repair the damaged vehicle. Generally speaking, the estimate generation engine 15 utilizes the context mapping module 35 to supplement, refine, or otherwise modify the initial set of globally-identified parts 28 to generate a jurisdictionally-based set of needed repairs 38, where the jurisdictionally-based set of needed repairs 38 includes per-unit parts, indications as to whether each per-unit part is to be repaired or replaced, as well as materials, labor operations, estimated time intervals, estimated costs, etc. and other information that is particular to repairing the vehicle in accordance with a particular jurisdiction associated with the damaged vehicle. In an embodiment, the jurisdictionally-based set of repairs 38 predicted to be needed to repair the damaged vehicle may be included in a draft estimate for the repair of the damaged vehicle, where the draft estimate includes, for example, a set of line entries, each of which corresponds to a respective part that is identified by a jurisdiction-specific identifier, and which indicates whether or not that part is to be repaired or replaced. For example, the draft estimate may indicate a physical unitary part indicated by its SKU or individual, per-unit part identifier that is to be replaced (e.g., a new tire), one or more respective related parts that are related to the a (e.g., nuts and bolts), a respective labor operation that corresponds to the part (e.g., labor for balancing and installation of the new tire), various costs that correspond to the part (e.g., the cost of the new tire and associated parts, the cost of disposing of the old tire, and the cost of labor to balance and install the new tire), time intervals corresponding to a part (e.g., for ordering and delivery, for installation, etc.), and the like. In another example, the draft estimate may indicate a physical unitary part that is to be repaired (e.g., a panel), and a respective labor operation that corresponds to the part (e.g., labor for re-aligning the panel). In yet another example, the draft estimate may indicate that a physical unitary part is to be repaired (e.g., a bumper assembly that includes fog lamps), and include various labor operations that are associated with the part repair (e.g., removing fog lamps prior to removing bumper assembly, replacing the fog lamps after the repaired bumper assembly has been re-installed, and aiming the fog lights properly).

Of course, in some implementations, the draft estimate may include an estimate of an overall cost and/or overall time interval for repairing the damaged vehicle.

At any rate, the inputs into the estimate generation engine 15 include indications of at least some of the initial set of parts 28 (e.g., their respective Global IDs 28 generated by the parts prediction engine 12), and an indication of a jurisdiction associated with the damaged vehicle. A "jurisdiction," as utilized herein, generally refers to a state, county, country, province, city/town/village, and/or other geographical and/or legally defined entity that may enact laws or rules to which the repair of vehicles is subjected (e.g., hazardous waste materials disposal, parts that meet emission standards, insurance regulations, taxes, fees, etc.). The jurisdiction corresponding to the damaged vehicle may be, for example, a jurisdiction in which the damage to the vehicle occurred, a jurisdiction that is determined from detecting content of the plurality of images 25a-25n (e.g., road signs, location tag, VIN number, license plate, and/or or metadata of the plurality of images, etc.), a jurisdiction in which the vehicle is registered, a jurisdiction in which the vehicle is to be repaired, a jurisdiction of an insurance policy covering the damaged vehicle, etc. The jurisdiction of the damaged vehicle may be determined using any suitable method, such as manually via user input (e.g., via a user interface 22 of the system 10), automatically via the input interface 18, parts prediction engine 12, estimate generation engine 15, specific image processing modules or models (not shown in FIG. 2), and/or other portions of the image processing system 10, and/or via automatically querying another system (such as jurisdictional registry or an insurance company system) based on the detected image content, user input, etc. Optionally, in conjunction with the globally-identified parts 28 and the indication of the jurisdiction associated with the damaged vehicle, the context mapping module 35 may operate on other data indicative of other characteristics of the damaged vehicle such as, for example, the vehicle's make, model, and year or year-range; VIN; license plate number and issuing jurisdiction; vehicle body type; etc. to determine the jurisdictionally-based set of repairs 38. At least some of the other characteristics of the damaged vehicle may be automatically determined, based on the images 25a-25n, by other models or modules of the context mapping module 15 (not shown), and/or via user input received via the user interface 22.

The context mapping module 35 of the estimate generation engine 15 operates on the Global IDs of the identified parts 28 and the indication of the jurisdiction in conjunction with accessing a parts database 37 and a jurisdictional requirements database 40 to determine the jurisdictionally-based set of repairs 38. Generally speaking, the parts database 37 includes a listing of possible or potential parts and data associated with each possible/potential part of each jurisdiction of multiple jurisdictions. The associated data of each possible/potential part includes, for example, its per-unit or individual part ID, a corresponding Global ID, indications of the jurisdictions in which the part may be utilized, indications of the vehicle model(s), years, and year ranges into which the part may be installed, associated vehicle build sheets, country of manufacture of the part, countries in which the part is sold, color, and the like. The jurisdictional requirements database 40 may contain or otherwise indicate which particular parts are available or are able to be utilized within various jurisdictions, and/or one or more rules, laws, policies, preferred practices, and/or incentives for repairing a vehicle within various jurisdictions, e.g., hazardous waste disposal requirements; materials which may or may not be utilized, due to, for example, emissions requirements, country of manufacture, and/or other criteria; insurance regulations; taxes; fees; and the like.

Thus, a "Global ID" of a part may be viewed (and interchangeably referred to herein) as a "universal key" of the part. That is, given the jurisdiction corresponding to the damaged vehicle, the universal key unlocks a jurisdictionally-compliant set of parts (and optionally labor operations) that are predicted to be associated with repairing the vehicle.

The context mapping model 35 may utilize one or more universal keys or Global IDs 28 associated with the damaged vehicle, data stored in the parts database 37, and data stored in the jurisdictional requirements database 40 in furtherance of determining a jurisdictionally-based set of repairs 38. In some embodiments, the data stored in the jurisdictional requirements database 40 may be used to refine, filter, supplement, or otherwise modify the universe of possible parts within the parts database 37 corresponding to the initial set of parts 28 determined by the parts prediction engine 12.

For example, the parts prediction engine 12 may determine, based on the analysis of the image attributes indicative of locations and contents of damages to the vehicle that were determined from the vehicle images, that the front bumper of the vehicle is crumpled. The Global ID of the front bumper may be provided to the estimate generation engine 15, which may use other inputted/determined data (such as the vehicle is a United States manufactured and operated vehicle of a particular make, model, and year range) in conjunction with data stored in the jurisdictional requirements database 40 in order to refine or filter the universe of possible parts that are indicated in the parts database 37 and that correspond to the Global ID of "front bumper" (e.g., the list of all front bumper parts and assemblies for all vehicles, manufactured anywhere in the world) down to a jurisdictionally-based list (e.g., a list of front bumper parts and assemblies for only United States manufactured vehicles of the particular make, model, and year range), each of which has its respective per-unit identifier (e.g., SKU, manufacturer-specific part identifier, etc.). For instance, for a Global ID of "front bumper" received from the parts prediction engine 12, the context mapping module 35 may obtain, from the parts database 37, a list of all parts corresponding to the Global ID of "front bumper," and may filter the list based on the vehicle model of the damaged vehicle, the year range of the damaged vehicle, the build sheet of the manufacturer of the damaged vehicle, the country of manufacture of the damaged vehicle, a color level of the damaged vehicle, and/or other filtering characteristics to thereby narrow the set of possible individual parts for replacing and/or repairing the front bumper assembly of the damaged vehicle.

In some embodiments, the context mapping module 35 may also filter out other data from the initial set of parts 28 and/or from the list of possible parts obtained from the parts database 37, such as logically incorrect predictions (e.g., a rear deck lid being predicted by the parts prediction engine 12 as being needed to repair a front-end accident), predictions of parts that have a confidence level lower than a given threshold, and/or parts 37 that have higher levels of complexity when parts 37 having lower levels of complexity are included on the list of possible parts. For example, for a Global ID indicating a "driver-side door," when the parts database 37 includes both a driver-side outer door panel part and an entire driver-side door assembly part associated with Global ID "driver-side door," the context mapping module 35 may filter out the latter from the list of possible parts due to its relative complexity. Thresholds of confidence levels and/or rules regarding the filtering out of more complex parts may be specified a priori, e.g. by a system user via a configuration and/or the user interface 22, or in-line with the processing of the images 25a-25n via the user interface 22. Accordingly, in view of the above, the context mapping module 35 of the estimate generation engine 15 filters out, from a universe of possible parts 37, irrelevant parts/repairs with respect to the damaged vehicle, irrelevant initial predictions, initial predictions falling below a threshold, high complexity parts, and the like. Subsequently, the context mapping module 35 applies automatic part selecting logic to the filtered list of possible parts.

For example, after applying multiple filters (e.g., manufacturing country of origin, make, model, year, location of damage, severity of damage, etc.) to the universe of possible parts 37 corresponding to a particular Global ID, when only one possible part remains on the list of possible parts, the context mapping module 35 may automatically identify/select the remaining part for inclusion in the jurisdictionally-based list of repairs 38. When multiple possible parts remain on the list of possible parts 37 corresponding to the particular Global ID, the context mapping module 35 may narrow the list based on which of the multiple possible parts have been most commonly utilized in historical vehicle repairs. For example, the jurisdictional requirements database 40 may contain historical data corresponding to a frequency of parts being ordered and/or utilized in repairs based on jurisdiction, vehicle make/model/year, insurance claims submitted, etc. over a particular, most recently occurring length of time (e.g., the last year). The context mapping module 35 may automatically identify/select the particular one of the multiple possible parts remaining on the list that has been most frequently utilized in the most recently-occurring repairs. Of course, other techniques may additionally or alternatively be utilized to narrow multiple possible parts to a single part that is to be included in the jurisdictionally-based list of repairs 38. In some embodiments, user input that is received via the user interface 22 may be utilized to narrow down the list of multiple possible parts, e.g., by providing narrowing and/or selection criteria, and/or by specifically indicating a particular part that is to be included in the jurisdictionally-based list of repairs 38.

Generally speaking, the initial set of parts 28 combined with the jurisdiction indication indicates a subset of the universe of possible individual, parts whose data is stored in the parts database 37 and corresponds to the jurisdiction, and the corresponding, jurisdictionally-based set of parts included in the jurisdictionally-based set of repairs 38 is at least a subset of the subset of the universe of possible parts corresponding to the jurisdiction. Additionally, as the initial set of parts 28 may not be individually mapped (e.g., in a one-to-one manner) to the jurisdictionally-based set of parts 38, a total number of parts included in the initial set of parts 28 may differ from a total number of parts included in the jurisdictionally-based set of parts 38.

At any rate, upon selecting the set of jurisdictionally-based parts, the context mapping module 35 may determine or predict, for each jurisdictionally-based part, whether the part is to be repaired or is to be replaced, e.g., based on part availability, costs of repairing the part vs. replacing the part (including any labor operations respectively associated therewith, such as remove and reinstall the part or related parts, refinish, paint-less dent repair, sublet, align, record, blend, etc.), time needed to repair or replace the part, insurance payments, confidence levels (e.g., as provided by the parts prediction engine 12), overall cost of vehicle repair (with various parts being replaced and various other parts being repaired), and/or other factors. Indeed, the context mapping module 35 may determine or predict labor operations time intervals and/or other time intervals (e.g., for shipping, order repair operations, and/or other wait times) for the respective repair and/or replacement of the set of jurisdictionally-based parts and/or for other labor operations which are associated with repairing the damaged vehicle. In an embodiment, the context mapping module 35 may utilize the data stored in the jurisdictional requirements database 40, the historical data store 32, and/or other historical data stores (not shown in FIG. 2) to determine repair/replace decisions, costs, and various time intervals associated with repairing the damaged vehicle.

For example, the historical data store 32 or another historical data store (not shown in FIG. 2) may contain historical data corresponding to labor costs and/or time intervals for repairing and/or replacing various parts in certain locations (e.g., state, city, region, zip code, etc.) and/or for certain insurance carriers, and the jurisdictional requirements database 40 may indicate jurisdictional requirements for disposing of hazardous material such as tires, paint, oil, etc. Accordingly, given the set of jurisdictionally-based parts, the context mapping module 35 may automatically add and/or modify line items for additional/different parts and/or labor operations that correspond to jurisdictional requirements 40 to which the repair of the vehicle would be subjected. Upon determining the set of jurisdictionally-based parts and labor operations, the context mapping module 35 may utilize one or more analytics techniques with respect to historical data (e.g., machine learning, statistical analysis and/or algorithms, rule-based logic, principle component analysis, multi-variable regression, etc., and/or other techniques such as those discussed above for the parts prediction model 30) to thereby generate a prediction or determination of labor-related and/or other types of time intervals for repairing the damaged vehicle. An estimation of at least some of the costs corresponding to the line items and/or corresponding to an overall cost estimate for repairing the vehicle may also be predicted or determined by the context mapping module 35 in a similar manner. In some embodiments, respective levels of confidences for at least some of the added and/or modified parts and labor operations and/or for various cost estimates may be determined by the context mapping module 35.

In some embodiments, the context mapping module 35 is trained or updated to account for additional data (e.g., additional jurisdictional data) that has been added to the parts database 37 and/or to the jurisdictional requirement database 40. Training or updating may be triggered periodically at a given interval, such as weekly, monthly or quarterly. Training or updating may be triggered when a particular quantity of additional data points have been added to the subject databases 37, 40. In some embodiments, prior to training, some portion of the historical data is deleted, such as discontinued parts, older labor cost data that no longer accurately reflects labor market wages, and like. Additionally or alternatively, training or updating may be triggered by a user request.

Thus, the jurisdictionally-based set of parts, whether or not each part is recommended to be replaced or repaired, related labor operations associated with each part (e.g., remove and reinstall the part or related parts, refinish, paint-less dent repair, sublet, align, record, blend, etc.), and/or labor operations otherwise associated with repairing the damaged vehicle, and optionally at least some estimated costs determined by the context mapping module 35 of the estimate generation engine 15 is collectively referred to herein as a jurisdictionally-based set of repairs 38 that is determined or predicted, by the image processing system 10, as being needed to repair the damaged vehicle based on the images 25a-25n of the damaged vehicle. That is, the estimate generation engine 15 of the image processing system 10 transforms, based on one or more requirements of a jurisdiction corresponding to the damaged vehicle, the initial set of globally-identified or categorical parts 28 into a jurisdictionally-based set of repairs 38 that are predicted or determined to be needed to repair the damaged vehicle depicted in the images 25a-25n, where the jurisdictionally-based set of repairs 38 includes a jurisdictionally-based set of parts, indications of whether or not each part is to be repaired or replaced, a jurisdictionally-based set of labor operations, estimated costs, time intervals, and other values, etc. The image processing system 10 may output an indication of the jurisdictionally-based set of repairs 38 via the output module 20. In some embodiments, the output 38 is provided in a draft estimate format, such as that described elsewhere herein.

The image processing system 10 may provide an indication of the jurisdictionally-based set of repairs 38 to one or more recipients, such as the user interface 22 and/or one or more different applications and/or systems 45a-45m. The one or more other applications or systems 45a-45m may be locally or remotely accessible to the system 10, and may include vehicle repair estimating applications, parts ordering applications, supply chain management applications, insurance applications, repair facility applications, other user interfaces, etc. In an embodiment, the jurisdictionally-based set of repairs 38 is included in the draft estimate 6 of FIG. 1, and the estimation generation component or system 3 of the intelligent estimation system 1 is a recipient of the jurisdictionally-based set of repairs 38 included in the draft estimate 6.

Generally speaking, image processing system 10 may employ one or more statistically based estimating or predictive models, programs, or routines, or portions thereof, such as those described in co-owned U.S. patent application Ser. No. 12/792,104, entitled "Systems and Methods of Predicting Vehicle Claim Cost" and filed on Jun. 2, 2010; co-owned U.S. patent application Ser. No. 14/218,165, entitled "System and Method of Predicting Vehicle Claim Information Based on Image Attributes" and filed on Mar. 18, 2014; co-owned U.S. patent application Ser. No. 14/460,907, entitled "System and Method of Predicting Vehicle Claim Information based on Image Attributes" and filed on Aug. 15, 2014; co-owned U.S. patent application Ser. No. 14/168,345, entitled "System and Method of Predicting a Vehicle Claim Supplement between an Insurance Carrier and a Repair Facility" and filed on Jan. 30, 2014; co-owned U.S. patent application Ser. No. 14/168,327, entitled "Systems and Methods of Predicting Vehicle Claim Re-Inspections" and filed on Jan. 30, 2014; co-owned U.S. patent application Ser. No. 14/218,148, entitled "System and Method of Predicting Vehicle Claim Information based on Deformation Images" and filed on Mar. 18, 2014; co-owned U.S. patent application Ser. No. 15/016,756, entitled "Imaging Processing System for Identifying Parts for Repairing a Vehicle" and filed on Feb. 5, 2016; co-owned U.S. patent application Ser. No. 15/079,356, entitled "Image Processing System for Vehicle Damage" and filed Mar. 24, 2016; and/or co-owned U.S. patent application Ser. No. 15/079,380, entitled "Image Processing System for Vehicle Damage" and filed on Mar. 24, 2016, the contents of each of which are hereby expressly incorporated herein.

Further, as the parts prediction engine 12 of the image processing system 10 operates on the Global IDs or universal keys of parts, the parts prediction engine 12 may easily be ported to and re-utilized across many different jurisdictions. Each jurisdiction needs only to connect its jurisdiction-specific estimate generation engine 15 to the universal parts prediction engine 12 to intelligently generate jurisdictionally-suitable draft vehicle repair estimates from images of a damaged vehicle.

Figure 3:
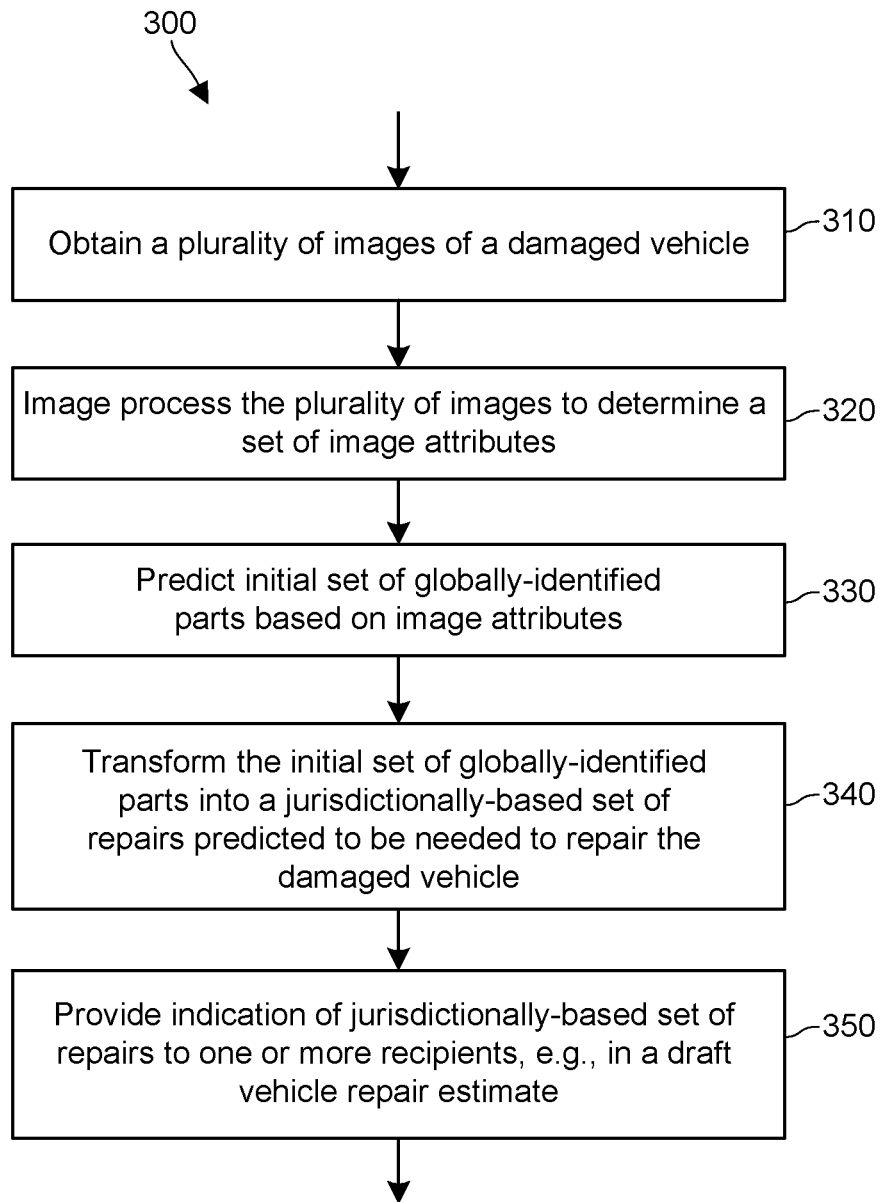
FIG. 3 is a flow diagram of an example method of processing images of a damaged vehicle to determine parts that are associated with repairing the vehicle in various different jurisdictions.

FIG. 3 depicts a flow diagram of an example method 300 of processing images of a damaged vehicle to determine or predict parts that that are associated with repairing the damaged vehicle. At least portions of the method 300 may be performed by the intelligent estimation system 1, the image processing system 10, or another suitable system. In an embodiment, the method 300 is performed in its entirety without any human intervention and/or in-line human input. In some implementations, the method 300 is performed in conjunction with other methods discussed in this document, or in conjunction with other methods that generate draft vehicle repair estimates. In some embodiments, the method 300 includes additional, less, or alternate functionality than that discussed with respect to FIG. 3, including that discussed elsewhere herein. For illustrative purposes, and not for limitation purposes, the method 300 is discussed with simultaneous reference to FIG. 2.

At a block 310, the method 300 includes obtaining one or more images of a damaged vehicle. For example, the one or more images of the damaged vehicle may be obtained via a user interface, a network interface, or from a database or data store. The obtained images may include only a single image, or may include multiple images of the damaged vehicle. Further, the obtained images may include static images and/or video images, and may include two-dimensional images and/or three-dimensional images. In an embodiment, at the block 310, obtaining the one or more images of the damaged vehicle includes selecting the one or more images from a plurality of images of the damaged vehicle. The selection of the one or more images may be based on one or more criteria, for example, a total number of desired images, image quality (e.g., resolution, size, dimensions, blurriness, glare, near or far fields, pixel count, brightness, color scheme, clarity, etc.), and/or contents that are depicted within various images (e.g., various parts, perspective views, and/or angles of the vehicle or portions of the vehicle, whether or not foreground objects are in the way, etc.). In some situations, the selection of the one or more images may be based on one or more thresholds, where the thresholds may be determined a priori, e.g. by a system user, or automatically by the system performing the method 300 based on various analytics engines and/or modules therein. For example, the selection of the one or more images may be based on a resolution threshold, a minimum and/or maximum number of different angles of the damaged vehicle, etc.

At a block 320, the method 300 includes image processing the obtained plurality of images to determine a set of image attributes that are indicative of the vehicle and the damages to the vehicle (e.g., an amount of damage, a type or content of damage, a location of the damage, a degree of damage, etc.). Determined image attributes may correspond to locations of image features, dimensions of image features, colors of points or areas of image, textures of points or areas immune of image, entropy seven image, contrast, lighting orientations locations or properties of shadows, etc., which may correspond to particular locations on or in the damaged vehicle, and/or to types or contents of damages (e.g., scratches, ripples, tears, dents, punctures, rips, holes, missing parts, misalignments, etc.). Determined image attributes may correspond to characteristics of the vehicle itself, such as make, model, trim level, year or year range, color, VIN, license plate number, etc., and/or to parts, components, and/or portions of the vehicle (e.g., passenger front door, rear bumper assembly, windshield, brake lights, front quarter panel, etc.). Determined image attributes may correspond to an environment in which the damaged vehicle is depicted, such as geographical location and/or timestamp corresponding to the capture of an image, etc.

Generally speaking, at the block 320, the method 300 may use any suitable image processing technology to automatically determine or ascertain the image attributes of the obtained one or more images. Ascertaining the image attributes may include, for example, automatically manipulating and comparing the obtained images with a base image or model of a similar vehicle that is uncompromised or undamaged, e.g., by using various techniques such as image correction, image alignment and adjustment (such as by using correlation filters), object isolation, object segmentation, filtering, landmark detection, boundary or edge detection, change detection (such as by utilizing convolutional neural networks (CNNs)), and the like, at least some of which may be applied to pixels of the obtained images, and in some cases, on a per-pixel basis. For example, at the block 320, the method 300 may employ at least portions of any of the image processing techniques described in aforementioned co-owned U.S. patent application Ser. Nos. 12/792,104; 14/218,165; 14/460,907; 14/168,345; 14/168,327; 14/218,148; 15/016,756; 15/079,356; and 15/079,380. Additionally or alternatively, at the block 320, the method 300 may employ other suitable image processing techniques to extract or ascertain image attributes from the obtained images.

At a block 330, the method 300 includes determining or predicting an initial set of parts for repairing the damaged vehicle based on the set of image attributes. The determination or prediction of the initial set of parts is based on one or more data analytics techniques applied to historical data that is associated with repairing vehicles, such as the historical database 32, and may be performed by a parts prediction engine, such as the parts prediction engine 12. The historical data includes image attribute data of the plurality of historical images of damaged vehicles as well as indications of parts that were utilized to repair the damaged vehicles depicted in the historical images, and whether such parts were replaced or repaired in order to repair the damaged vehicles depicted in the historical images. The historical data may include other attributes corresponding to the damaged vehicles depicted in historical images, such as make, model, year, year range, body style, vehicle owner name, street, city and state address, impact points, vehicle drivable condition, and/or other attributes such as those discussed above with respect to historical data store 32.

In an embodiment, the data analytics techniques applied to the historical data include a one or more statistical algorithms and/or analyses performed on the historical data to determine relationships between image attributes of damaged vehicles and actual parts utilized to repair the damaged vehicles. The actual parts utilized to repair the damaged vehicles may be indicated by their respective global identifiers, Global IDs, or universal keys for the purposes of data analytics. In an embodiment, the parts prediction engine includes a parts prediction model that was generated via the data analytics techniques performed on the historical data, during which the actual parts utilized to repair the damaged vehicles were referenced by their respective Global IDs. Thus, generally speaking, the parts prediction model may operate on inputted image attributes of images of a damaged vehicle to thereby output Global IDs of a set of parts that are predicted to be associated repairing the damaged vehicle depicted by the images. in some embodiments, the parts prediction model may generate one or more respective confidence levels or scores for one or more of the predicted parts, where the one or more respective confidence levels or scores may be indicative of a likelihood of the part being associated with repairing the vehicle, a likelihood of the part being replaced in order to repair the vehicle, and/or a likelihood of the part being repaired in order to repair the vehicle. In some embodiments, the parts prediction model may also output indications of various labor operations that are predicted to be associated with repairing the damaged vehicle, and respective confidence levels or scores for the labor operations. In some embodiments, the method 300 includes generating the parts prediction model based on the statistical algorithms and/or analyses of the historical data associated with repairing damaged vehicles.

Indeed, at the block 330, whether the initial set of parts is determined or predicted via a parts prediction model or via some other suitable technique, in an embodiment, the initial set of determined/predicted parts may be indicated by their respective Global IDs or universal keys.

At a block 340, the method 300 includes transforming the initial set of parts that are predicted to be needed to repair the vehicle into a jurisdictionally-based set of repairs that are predicted to be needed to repair the damaged vehicle. The transformation is not a mere one-to-one translation of global IDs of parts into jurisdictionally-based IDs of parts. Rather, the transformation is based on a jurisdiction associated with the damaged vehicle, for example, types of parts and/or combinations of parts that are legally able to be obtained and/or utilized within the jurisdiction, types of parts and/or combinations of parts that satisfy insurance regulations of the jurisdiction, etc. For example, at the block 340, an initial globally-identified part of "paint" may be transformed into a specific type of paint whose fumes are below a jurisdictionally-mandated toxicity level. In another example, at the block 340, an initial globally-identified part may be transformed into a specific type of part that was recalled within the jurisdiction. Jurisdictional requirements of multiple different jurisdictions may be stored within a jurisdiction requirements database, such as the jurisdictional requirements database 40, which may be accessed during the execution of the method 300.

Further, transforming the initial set of parts into the jurisdictionally-based set of repairs (block 340) is not limited only to predicting or identifying jurisdictionally-based parts. The jurisdictionally-based set of repairs transformed from the initial set of parts may also include one or more labor operations that are predicted to be needed to repair the damaged vehicle, such as blending paint treatment across panels, re-aiming headlights, removing and replacing a dashboard assembly to provide access to other parts, hazardous waste disposal, etc. The one or more labor operations may be determined based on one or more initially determined parts (block 330), one or more determined jurisdictionally-based parts, and/or or one or more jurisdictional requirements, for example. In some implementations, the jurisdictionally-based set of repairs may additionally include costs and/or time intervals associated with at least some of the predicted jurisdictionally-based parts and/or at least some of the predicted jurisdictionally-based labor operations.

In an embodiment, at the block 340, the method 300 may include filtering a database or data store that includes data indicative of a multi-jurisdictional list of possible parts for repairing vehicles, such as the parts database 37. The filtering may be performed by a context mapping module of the estimate generation engine, and may be based on the set of global IDs of predicted parts and a jurisdiction associated with the damaged vehicle. As previously discussed, the jurisdiction associated with the damaged vehicle may be a state, county, country, province, city/town/village, and/or other geographical and/or legally defined entity that may enact laws or rules to which the repair of vehicles is subjected. In an embodiment, the method 300 may automatically determine the jurisdiction associated with the damaged vehicle (not shown in FIG. 3). For example, the method 300 may utilize determined image attributes to automatically determine the jurisdiction associated with the damaged vehicle.

At any rate, at the block 340, the method 300 may include selecting, e.g., by the context mapping module, the jurisdictionally-based set of parts from the filtered list of possible parts. Various criteria may be utilized for the selection, such as cost of parts, cost of labor to install the part and dispose of the damaged part, cost of labor to repair the part, time required to install the part, time required to repair the part, availability of parts within the jurisdiction, insurance costs, degree of damage, location of damage, and the like. As such, selecting the jurisdictionally-based set of parts may include accessing other databases and/or systems for related data, such as parts availability and insurance cost limits. The block 340 may utilize predictive filtering and selection techniques such as those described in co-owned U.S. Pat. No. 9,218,626, the entire disclosure of which is incorporated by reference herein, and/or the block 340 may utilize other types of filtering and selection techniques, such as other types of analytical filtering, iterative filtering, templates, etc.

Indeed, in an embodiment of the block 340, the method 300 may include modifying an initially determined set of jurisdictionally-identified parts. For example, modifying the initially determined set of jurisdictionally-identified parts may include: adding one or more parts to the jurisdictionally-based set of parts that were not indicated in the initially determined set of globally-identified parts and/or in the initially determined set of jurisdictionally-identified parts; deleting an extraneous part from the jurisdictionally-based set of parts; etc. The modification of the initially determined set of jurisdictionally-identified parts may be determined by utilizing any suitable technique, such as predictive models generated based on the historical vehicle repair data 32, deterministic associations, user input, and the like.

Generally speaking, a total number of parts indicated by the jurisdictionally-based set of repairs as finalized at the block 340 is different than (e.g., greater than) a total number of the initial set of parts as determined at the block 330, as the initial set of parts of block 330 are represented by their categorical or generalized Global IDs or universal keys, which generally may be expanded into a set of multiple jurisdictionally-based set of parts (and optionally one or more labor operations) that are predicted to be related to repairing the damaged vehicle.

At a block 350, the method 300 includes providing an indication of the jurisdictionally-based set of repairs to one or more recipients. For example, the indication of the jurisdictionally-based set of repairs may be provided to one or more local and/or user interfaces, one or more local and/or remote computing systems, and/or one or more locally- or remotely-executing applications, such as vehicle repair estimating applications, parts ordering applications, supply chain management applications, insurance applications, repair facility applications, other user interfaces, etc. In an embodiment, an indication of the jurisdictionally-based set of repairs is provided to the estimation generation component or system 3 of the intelligent estimation system 1. In some implementations, the indication of the jurisdictionally-based set of repairs that is provided to the one or more recipients includes predicted costs and/or time intervals associated with at least some of the jurisdictionally-based set of repairs.

At the block 350, the indication of the jurisdictionally-based set of repairs that is provided to one or more recipients may be of any suitable format or representation. For example, the indication of the jurisdictionally-based set of repairs may be an interactive, electronic representation of the vehicle that highlight various components and provide related information (e.g., whether the part is to be repaired or replaced, associated labor operations, time intervals, costs, alternative, etc.) if so requested by a user. In some embodiments, the indication of the jurisdictionally-based set of repairs may be provided in an aesthetic digital format that models a physical estimate that would be generated/provided by an insurer, repair shop, technician, or other auditing/estimating/repair enterprise or professional.

In some embodiments (not shown in FIG. 3), the method 300 may include obtaining other types of data corresponding to the damaged vehicle, such as telematics data, incident facts, a vehicle build sheet, sensor data, diagnostics data, accident reports, agent and/or law enforcement notes, surveillance camera video, etc. In these embodiments, at least some of the other obtained data that is related to the damaged vehicle may be utilized along with the image attributes to predict the initial set of globally-identified parts (block 330).

Additionally, although the method 300 is described above as operating on image attribute data indicative of damages to a vehicle, the method 300 may easily be adapted to operate on the other types of data corresponding to the damaged vehicle independently of or in conjunction with image attribute data, and/or independently of or in conjunction with other types of data associated with damages to a vehicle. For example, instead of operating on image images and image attributes of the damaged vehicle at the blocks 310, 320, and 330, the method 300 may operate on telematics data of the damaged vehicle, e.g., by obtaining telematics data generated by various sensors and/or components of the damaged vehicle, processing the telematics data to determine attributes indicative of damages to the vehicle, and predicting the initial set of globally-identified parts based on the determined telematics attributes. Telematics data may include telemetry data and/or any type of data that is indicative of conditions that are sensed or detected by various sensors and components on-board the vehicle, for example, the change in speed of the vehicle from moments in time just before and just after a collision (e.g., 500 ms before and 500 ms afterwards, or some other suitable time intervals), change in the direction of the vehicle in from moments of time just before and just after the collision (e.g., to determine direction of impact force), etc. With respect to the method 300, diagnostic data may be obtained directly from a vehicle component (such as a wireless transceiver or other on-board data delivery port) or from a computing system to which telematics data has been uploaded.

In another example embodiment, instead of operating on image images and image attributes of the damaged vehicle at the blocks 310, 320, and 330, the method 300 may operate on 05' include obtaining diagnostics data generated by diagnostic scans of various modules and components of the damaged vehicle, processing the diagnostics data to determine attributes indicative of damages to the vehicle, and predicting the initial set of globally-identified parts based on the determined diagnostic attributes. Diagnostics data may include a set of codes that generated by on-board diagnostics modules and/or components based on diagnostic scans, and may include error codes, status codes, and the like. With respect to the method 300, diagnostic data may be obtained directly from a vehicle component (such as a diagnostic port) or from a computing system to which diagnostic data has been uploaded.

Figure 4:
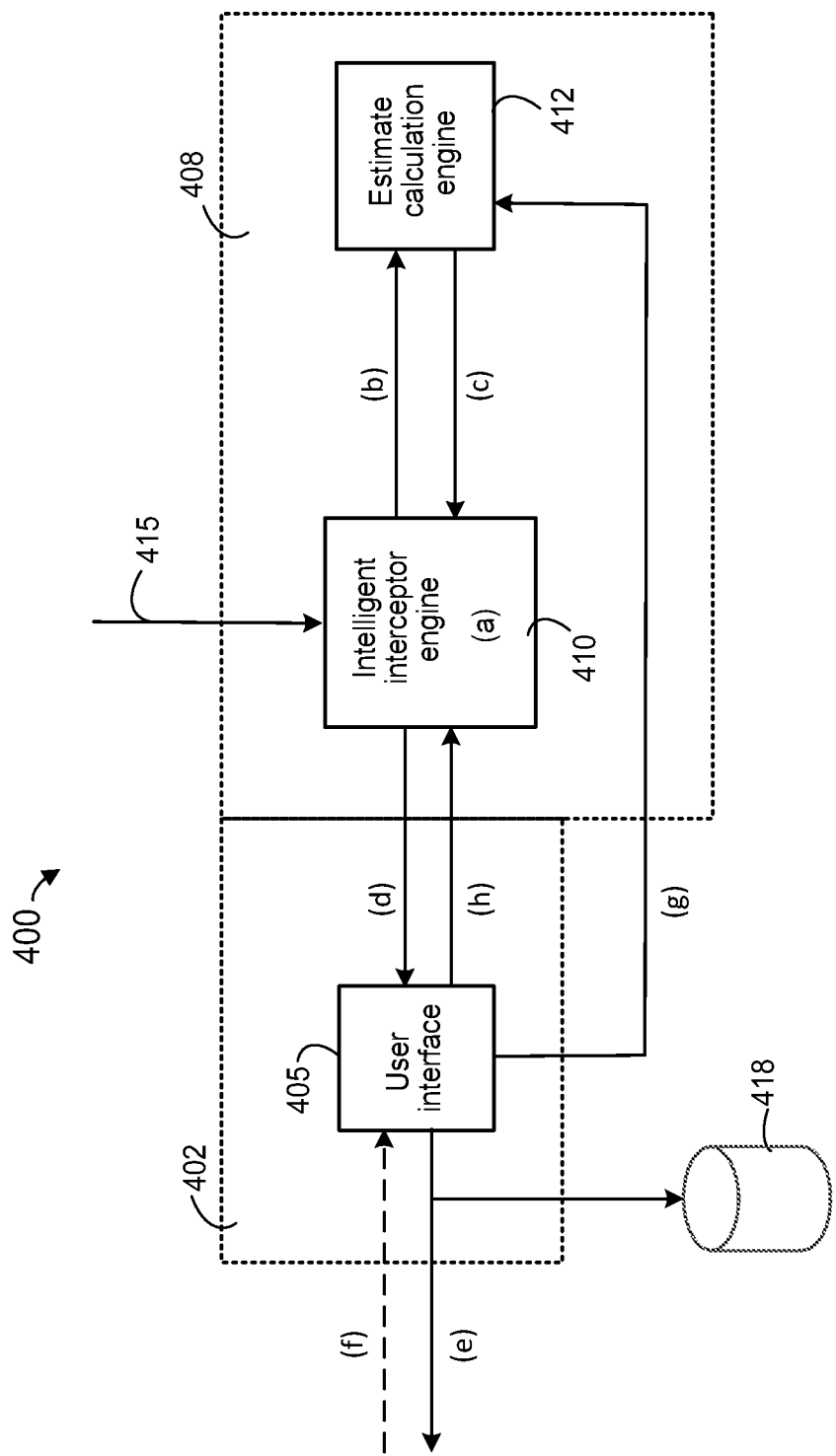
FIG. 4 is a high-level block diagram depicting an example data flow through an estimate refinement system that utilizes a hybrid and iterative human-machine architecture to refine and complete an estimate for repairing a damaged vehicle.

FIG. 4 is a high-level block diagram depicting an example data flow through an estimate refinement system 400 that utilizes a hybrid and iterative human-machine architecture to refine and complete an estimate for repairing a damaged vehicle. In an example, the hybrid estimate refinement system 400 may be the estimate refinement component 3 of the intelligent estimation 1 of FIG. 1. In another example, the hybrid estimate refinement system 400 may be a stand-alone system.

The hybrid estimate refinement system 400 includes a human-facing portion 402 that includes a user interface 405 via which a human user may review and modify a draft estimate. The system 400 also includes a machine portion 408 via which the system 400 may review and modify a draft estimate without any human input or intervention, where the machine portion 408 includes an intelligent interceptor engine 410 coupled to an estimate calculation engine 412. The user interface 405, the intelligent interceptor engine 410, and the estimate calculation engine 412 of the system 400 cooperate in a nested, iterative manner to revise, refine, and complete a draft estimate for repairing a vehicle. In an embodiment, each component 405, 410, 412 of the system 400 may comprise a respective set of computer-executable instructions stored on one or more tangible, non-transitory computer-readable storage media, and one or more processors may execute each set of instructions to cause the system 400 to perform at least the features, functionalities, techniques, and capabilities described herein. In some embodiments, at least a respective portion of one or more of the components 405, 410, 412 may comprise firmware and/or hardware. The system 400 may include other components that are not illustrated in FIG. 4, such as one or more displays, input interfaces, output interfaces, and/or network interfaces, other computer-executable modules, etc.

Generally speaking, the intelligent interceptor engine 410 serves as an orchestrator, quarterback, or director of the hybrid estimate refinement system 400. As such, the intelligent interceptor engine 410 ingests or obtains draft vehicle repair estimates on behalf of the system 400, and determines how the draft estimates are to be processed by the system 400 (e.g., machine-only, hybrid human-machine, etc.).

To illustrate with a first example scenario, the intelligent interceptor engine 410 obtains, on behalf of the system 400, an initial draft estimate 415 for repairing a damaged vehicle. The initial draft estimate 415 may be, for example, the draft estimate 6 obtained from the image processing component 2 of FIG. 1 or from the image processing system 10 of FIG. 2. As such, the initial draft estimate 415 may include indications of jurisdictionally-based replacement repairs 38 that are predicted as being needed to repair the damaged vehicle. Of course, the initial draft estimate 415 may be obtained from other automated processing systems, e.g., via a network interface of the system 400 (not shown), or the initial draft estimate 415 may be obtained via manual entry at the user interface engine 405.

The initial draft estimate 415 typically includes a set of entries (also referred to interchangeably herein as "line entries"), each of which corresponds to a respective part that is predicted or earmarked as being needed to repair the vehicle (e.g., either by replacing the part or by repairing the part). For example, an entry may respectively correspond to a respective physical part (e.g., a new tire), a respective labor operation that corresponds to a part (e.g., labor for installation of the new tire), a respective cost that corresponds to a part (e.g., the cost of the new tire, the cost of disposing of the old tire, and the cost of labor to install the new tire), a time interval corresponding to a part (e.g., for ordering and delivery, for installation, etc.), and the like. In another example, an entry may identify a particular part (e.g., by name, part number, manufacturer, etc.), and the entry may include various fields corresponding to whether or not the part is to be repaired or replaced, labor, cost(s), time intervals, etc. associated with the identified part. At any rate, each entry includes a respective one or more fields, and the various fields of the obtained initial draft estimate 415 may or may not be populated with respective values.

The intelligent interceptor engine 410 analyzes the obtained initial draft estimate 415, e.g., as denoted in FIG. 4 by (a). In an example scenario, based on the analysis at (a), the intelligent interceptor engine 410 may automatically (e.g., without any human input) determine one or more modifications to the initial draft estimate 415. Generally speaking, the one or more modifications determined by the intelligent interceptor engine 410 are contextual in nature to the content of the initial draft estimate 415. That is, the one or more contextual modifications may include a population of a value into an empty field, a modification of an existing value populated into a field, an addition of another field, a deletion of an existing field, etc. Examples of contextual modifications that may be automatically determined by the intelligent interceptor engine 410 include: for any part that is being painted, adding a line entry for clear coating (e.g., parts, labor, etc.); adding a line entry for hazardous waste disposal when paint is being sprayed onto the vehicle; replacing any values that are indicative of recalled parts with their respective approved, substitute parts; etc.

In some embodiments, at (a), the intelligent interceptor engine 410 may determine at least some of the contextual modifications based on a configuration that has been defined a priori, e.g., by system user. For example, the configuration may specify default values of various fields, may specify particular fields that are required for particular parts, may specify which fields and/or field values are to be automatically populated into draft estimates without any user intervention or user input, etc. In some scenarios, at (a), the intelligent interceptor engine 410 may additionally or alternatively determine at least some of the contextual modifications based on one or more analytics techniques. In an embodiment, the intelligent interceptor engine 410 may utilize a model trained on historical vehicle repair data to determine needed parts and labor. For example, the model may indicate that for a given a part A that is included in a draft estimate, part B, part C, and three units of part D are needed to accomplish the replacement of part A, as well as four hours of labor. The model may be tuned based on limits and/or weights (e.g., related to costs, time, confidence levels, etc.), which may be provided by a system user within the system configuration, for example.

At any rate, at (a), the intelligent interceptor engine 410 automatically (e.g., without any human input) revises the draft estimate 415 to incorporate the one or more contextual modifications determined by the intelligent interceptor engine 410. That is, the intelligent interceptor engine 410 modifies the draft estimate 415 to incorporate the one or more system-generated contextual modifications, and the intelligent interceptor engine 410 provides the contextually-modified draft estimate to the estimate calculation engine 412, as denoted in FIG. 4 by the arrow (b).

The estimate calculation engine 412 operates on the contextually-modified draft estimate to generate a system-modified draft estimate therefrom, where the system-modified draft estimate includes an estimated total cost of repair for the system-modified draft estimate, as well as breakdowns of parts, labor, other line items, time intervals, etc. Generally speaking, the estimate calculation engine 412 operates on the contextual information (e.g., entries, fields, populated and unpopulated values) included in the contextually-modified draft estimate to calculate various values for inclusion the system-modified draft estimate, such as costs, time intervals, etc.

In particular, to generate the system-modified draft estimate, the estimate calculation engine 412 may look up or request (e.g., from other computing devices, systems and/or databases, which are not illustrated in FIG. 4) prices/costs of indicated parts, labor times/costs for replacing the parts, and other such data. Additionally, to generate the system-modified draft estimate, the estimate calculation engine 412 may determine or calculate various costs and/or time intervals, such as (but not limited to): taxes on parts and/or on labor based on jurisdiction; costs and/or line items that are related to requirements that are jurisdiction-specific (e.g., regulatory requirements) and/or that are specific to a configuration provided by a system user (for example, a cap or maximum limit on the cost of paint materials); costs and/or line items that are related to various labor operations/functions needed to repair the vehicle; refinish time intervals; overlapping time intervals for portions of the repair; and the like. Generally, the estimate calculation engine 412 may generate the system-modified draft estimate based on the values included in the fields of the contextually-modified draft estimate, obtained data, a configuration specified a priori by the system user, and/or other data.

Upon generating the system-modified draft estimate, the estimate calculation engine 412 provides the system-modified draft estimate to the intelligent interceptor engine 410, as denoted in FIG. 4 by the arrow (c). The intelligent interceptor engine 410 evaluates (e.g., as denoted in FIG. 4 by (a)) the system-modified draft estimate to determine if the system-modified draft estimate is subject to any further contextual modifications. For example, the intelligent interceptor engine 410 may determine that the system-modified draft estimate is missing various values, is missing various fields, includes extraneous fields, and/or has line items that need completion. In some scenarios, at (a), the intelligent interceptor engine 410 may determine that the intelligent interceptor engine 410 is able to provide the further contextual modifications without any user input. Accordingly, at (a), the intelligent interceptor engine 410 automatically revises the system-modified draft estimate to incorporate the additional system-generated contextual modifications, and provides the further-contextually-modified draft estimate to the estimate calculation engine 412, e.g., as denoted by the arrow (b). The estimate calculation engine 412 operates on the further-contextually-modified draft estimate to generate a system-further-modified draft estimate therefrom, which includes an estimated total cost of repair as well as breakdowns of costs of parts, labor, and/or other line items, associated time intervals, etc. Subsequently, the estimate calculation engine 412 returns the system-further-modified draft estimate to the intelligent interceptor engine 410, e.g., as denoted by the arrow (c), and the intelligent interceptor engine 410 evaluates the system-further-modified draft estimate, as denoted by (a). Generally speaking, the intelligent interceptor engine 410 and the estimate calculation engine 412 of the machine portion 408 may iteratively perform the loop (b)-(c)-(a) as long as the intelligent interceptor engine 410 determines and applies (e.g., at (a)) still additional system-generated modifications to a current system-modified draft estimate that has been most recently provided by the estimate calculation engine 412 (as per the arrow (c)).

During some iteration of the loop (b)-(c)-(a) executed by the machine portion 408 of the intelligent estimate refinement system 400, the intelligent interceptor engine 410 determines at (a) that no further system-generated modifications are to be incorporated by the system 400 into a current system-revised draft estimate that has been most recently provided by the estimate calculation engine 412 (as per the arrow (c)). Upon making this determination, the intelligent interceptor engine 410 may provide the current system-revised draft estimate to the user interface 405 (e.g., as denoted in FIG. 4 by the arrow (d)).

The user interface 405 may present an interactive display of the current system-revised draft estimate for user review and optional user-generated approval or modification. If the user approves of the current draft estimate, e.g., by activating a corresponding user control (as denoted in FIG. 4 by the arrow (f)), the approved estimate may be stored in a system data store or database 418 and/or may be transmitted to other computing systems (as denoted in FIG. 4 by the arrow (e)). Generally speaking, the user interface 405 may be implemented locally or remotely with respect to the system 400. For example, the user interface 405 may be locally implemented via a display of the system 400, or the user interface 405 may be remotely implemented on a user device, e.g., via an Application Programming Interface (API) or other similar mechanism.

On the other hand, if the user indicates a desired contextual modification to the current system-revised draft estimate via the user interface 405 (e.g., as denoted by the arrow (f)), in an embodiment, the user interface 405 revises the current system-revised draft estimate to incorporate the user-generated contextual modification, and provides the contextually-modified, current system-revised draft estimate to the estimate calculation engine 412, e.g., as denoted in FIG. 4 by the arrow (g). Alternatively, in another embodiment, when the user indicates a desired contextual modification to the current system-revised draft estimate via the user interface 405 (e.g., as denoted by the arrow (f)), the user interface 405 may delegate, to the intelligent interceptor engine 410, the incorporation of the user-generated contextual modification into the current system-revised draft estimate and the provision of the contextually-modified, current system-revised draft estimate to the estimate calculation engine 412, e.g., as denoted in FIG. 4 by the data flow (h)-(a)-(b). The various possible types of user-generated contextual modifications may be similar to the various possible types of the system-generated contextual modifications discussed above.

At any rate, the estimate calculation engine 412 operates on the contextually-modified, current system-revised draft estimate, thereby generating a user-modified draft estimate. The user-modified draft estimate may include an estimated total cost of repair for the user-modified draft estimate as well as breakdowns of parts, labor, and/or other line items, e.g., similar to that discussed above with respect to system-generated modified draft estimates. Upon generating the user-modified draft estimate, the estimate calculation engine 412 provides the user-modified draft estimate to the intelligent interceptor engine 410, as denoted in FIG. 4 by the arrow (c). Subsequently, at (a), the intelligent interceptor engine 410 evaluates the user-modified draft estimate to determine if the user-modified draft estimate is subject to any further system-generated contextual modifications. If the intelligent interceptor engine 410 determines one or more further contextual modifications to the user-modified draft estimate, the intelligent interceptor engine 410 may automatically incorporate the contextual modifications into the user-modified draft estimate, and the machine portion 408 of the system 400 may again execute the loop (b)-(c)-(a) with respect to the contextually-modified, user-modified draft estimate, e.g., in a manner similar to that described above.

Alternatively, if the intelligent interceptor engine 410 determines at (a) that no further modifications to the user-modified draft estimate are needed, the intelligent interceptor engine 410 provides the user-modified draft estimate for interactive display at the user interface 405, as denoted by the arrow (d). Via the user interface 405, the user may review the displayed user-modified draft estimate and, via the user interface 405, the user may enter an approval of the draft estimate or may indicate additional user modifications, as denoted by the arrow (f). When the user indicates approval of the draft estimate via the user interface 405 (e.g., at (f)), the approved estimate may be delivered to another computing system (e.g., as denoted by (e)), and/or the approved estimate may be stored in a data store or database 418 that is accessible to the system 400. On the other hand, when the user indicates one or more further contextual modifications via the user interface 405 (e.g., at (f)), the system 400 may incorporate the further user-generated contextual modifications into the user-modified draft estimate and provide the further contextually-modified, user-modified draft estimate to the estimate calculation engine 412, e.g., via (g) or via (h)-(a)-(b). The estimate calculation engine 412 may operate on the values included in the contextually-modified, user-modified draft estimate, thereby generating a user-further-modified draft estimate that is delivered to the intelligent interceptor engine 410 for further evaluation, e.g., as denoted by the arrow (c). Subsequently, at (a), the intelligent interceptor engine 410 may evaluate the user-further-modified draft estimate, which may cause the system 400 to again execute the loop (b)-(c)-(a) with respect to the user-further-modified draft estimate, or which may cause the system 400 to provide the user-further-modified draft estimate to the user interface 405 (e.g., as denoted by (d)) for user review and optional additional user modification.

Thus, generally speaking, the machine portion 408 of the system 400 iteratively executes one or more iterations of a smaller loop (b)→(c)→(a) that is nested within each iteration of a larger, hybrid human-machine loop, e.g., (d)→(f)

→[(g) or (h)] that is cooperatively executed by both the user-facing portion 402 and the machine portion 408 of the system 400. By utilizing these two nested loops, the intelligent estimation system 400 iteratively revises, refines, and completes an initial draft estimate 415 by incrementally incorporating system-generated modifications within the smaller loop, and by incrementally incorporating user-generated modifications within the larger loop.

Viewing the execution of the larger loop from the perspective of the user interface 405, each time a single or individual user-modification to a current draft estimate is entered by the user (e.g., via (f)) and provided to the machine portion 408 of the system (e.g., via (g) or (h)), the machine portion 408 of the system 400 operates on the single or individual user-modification to generate a resulting updated draft estimate that is presented at the user interface 405 (e.g., via (d)). However, the resulting updated draft estimate (d) that is presented at the user interface 405 in response to the user-generated modification (f) has been operated on by one or more iterations of the smaller, nested machine loop (b)→(c)→(a), and thus includes, in addition to the user-generated modification initially indicated via (f), numerous values, fields, and/or other contextual modifications that have been automatically (e.g., without human input and/or intervention during the data flow) determined and applied to the draft estimate by the machine portion 408 of the system 400.

Moreover, and significantly, in a preferred (but non-limiting) embodiment, the updated draft estimate (d) generated by the machine portion 408 in response to the user-generated modification (f) is presented on the user interface 405 in real-time upon the user entering the modification (f), e.g., in a What-You-See-Is-What-You-Get (WYSIWYG) manner. That is, with each single selection, entry, click, keystroke, or other modification of the user (f) via the user interface 405, a respective updated draft estimate (d) is generated in real-time by a single iteration of the larger loop (d)→(f)→[(g) or (h)] in conjunction with potentially multiple iterations of the smaller loop (b)→(c)→(a), so that the updated draft estimate (d) is presented at the user interface 405 in response to the input (f) without any user-perceptible delay. Accordingly, the intelligent estimation system 400, and in particular, the machine-portion 408 of the system 400, enables a draft vehicle repair estimate to be refined more efficiently and more quickly as compared to known machine-assisted estimate calculation programs that utilize only human feedback to determine contextual updates.

Indeed, in some implementations, the intelligent interceptor engine 410 may be communicatively connected to a known machine-estimate calculation template (such as that described in the Background section above) instead of to the estimate calculation engine 412, to thereby improve the content, quality, and performance of vehicle repair estimates generated by the known machine-estimate calculation template or form. In these implementations, any human-generated modifications received via the user interface 405 may be incorporated by the intelligent interceptor engine 410 instead of by the user interface 405. That is, in these implementations, the system 400 may utilize the data flow (h), and the data flow (g) may be omitted.

Returning again to the system 400 of FIG. 4, in a second example scenario, the intelligent interceptor engine 410 obtains and analyzes an initially-received draft estimate 415, e.g., as denoted by (a), and, based on the analysis, the intelligent interceptor engine 410 determines that the machine portion 408 of the system 400 does not need to make any system-generated modifications to the initial draft estimate 415. Further, at (a), the intelligent interceptor engine 410 may determine that the initial draft estimate 415 may or may not require any human-generated modifications. In this second example scenario, the intelligent interceptor engine 410 directly provides the obtained initial draft estimate 415 to the interface 405 for user review and potential user modification, e.g., as denoted by the arrow (d). Subsequent data flow related to the initial draft estimate 415 is based on any user approval or any user user-generated contextual modifications received via the user interface 405, and may proceed in manners such as discussed above.

In some embodiments of the system 400, the intelligent interceptor engine 410 generates one or more sets of guidance annotations to aid a user in revising, refining, and/or completing a current draft estimate that is displayed on the user interface 405. For example, in FIG. 4, the intelligent interceptor engine 410 may determine at (a) that the machine portion 408 of the system 400 does not need to make any system-generated modifications to a current draft estimate, where the current draft estimate may be the initial draft estimate 415, or may be a user- and/or system-modified draft estimate that incorporates one or more user-generated and/or system-generated modifications to the initial draft estimate 415. In these embodiments, prior to the intelligent interceptor engine 410 sending the current draft estimate to the user interface 405 for user review and potential user modification (e.g., prior to following the arrow (d)), the intelligent interceptor engine 410 may determine at (a) a set of guidance annotations corresponding to the current draft estimate. For instance, the intelligent interceptor engine 410 may evaluate the entries or line items included in the current draft estimate and any values populated therein to generate one or more sets of guidance annotations that are presented to the user at the user interface 405 in conjunction with the current draft estimate. For example, a particular field of the draft estimate may be annotated with an indication of available guidances pertaining to the particular field to aid the user in modifying the estimate. Multiple sets of guidance annotations corresponding to multiple different entries, fields, and/or values, and/or corresponding to the current draft estimate as a whole may be determined at (a) by the intelligent interceptor engine 410.

Generally, the one or more sets of guidance annotations include guidances and/or suggestions as to how the user may further extend, edit, refine, or complete the current draft estimate. Each guidance annotation may be related to one or more entries, fields, and/or values (either populated or unpopulated) of the current draft estimate, and annotated thereto. The intelligent interceptor engine 410 provides the one or more sets of guidance annotations to the user interface 405 in conjunction with the current updated draft (e.g., as denoted by the arrow (d)), and the user interface 405 presents indications of the sets of guidance annotations in conjunction with the current draft estimate. For some sets of guidance annotations, an indication of an available set of guidance annotations may be contextually displayed in-line with a corresponding entry of the current draft estimate.

For example, at (a), the intelligent interceptor engine 405 may determine that human input is required to specify which value of a plurality of a limited set of possible values is to populate a particular field. As such, the intelligent interceptor engine 405 annotates or otherwise associates the particular field of the current draft estimate with a set of guidances, and provides the current draft estimate and the associated set of guidance annotations pertaining to the particular field to the user interface 405 (e.g., as denoted by the arrow (d)). At the user interface 405, a user control may be presented next to or proximate to the particular field, thereby indicating the presence of the guidance annotations pertaining to the particular field. Upon the user activating the user control at the user interface 405, a drop-down menu including the limited set of possible values for the particular field may be presented, and the user may make the modification (f) by selecting one of the menu items. Indeed, the subsequent user input (f) entered via the user interface 405 may be based on one or more of the guidance annotations that are presented in conjunction with the current draft estimate, however, this is not a requirement, as the user may choose to modify some other aspect of the current draft estimate other than those indicated by guidance annotations.

Of course, guidance annotations are not limited to being displayed at the user interface 405 using only drop-down menus, but may be displayed in any useful form, such as via fields into the user can enter free-form text, pop-up windows, visual effects to bring the user's attention to or direct the user's attention away from various fields and/or values, and the like. Further, various types of guidance annotations may be associated with respective entries, fields, and/or values of the current draft estimate, and/or with the current draft estimate as a whole. For example, for a particular field included in the current draft estimate, a set of related guidance annotations may include value-related suggestions, such as: a suggestion to modify an existing value of the particular field, a suggestion to modify an existing value of another field based on the existence of the particular field and/or the existing value of the particular field, a suggestion of one or more values to populate into the particular field when the particular field is empty, a suggestion of one or more values to populate into another field based on the existence of the particular field and/or the existing value of the particular field (e.g., via a drop-down list or other suitable mechanism), etc. Additionally or alternatively, the set of guidance annotations may include field-related suggestions, such as: a link from the particular field to another field included in the current draft estimate, a suggestion to add an additional field to the current draft estimate, a suggestion to remove an existing field of the current draft estimate, etc.

In some implementations, the set of guidance annotations may include a single-click guidance annotation, where the single-click annotation indicates a particular group of modifications (which may be associated with a single field, with multiple fields, or the entire draft estimate). Upon a single activation of a user control associated with the single-click annotation, the entirety of the particular group of modifications is automatically applied to the current system-modified draft estimate. In some implementations, the set of guidance annotations may include an interactive guidance annotation that indicates a specific group of modifications from which a user may select one or more modifications. The interactive guidance annotation is associated with one or more user controls via which the user may make his or her selection(s), and applies only user-selected modifications of the specific group of modifications to the current system-modified draft estimate. In some implementations, the set of guidance annotations may include an informative guidance annotation that indicates other information which may be useful or informative to aid the user in refining the current system-modified draft estimate, e.g., additional actions to consider, information which may inform a user selection of various values, configuration parameter limits, regulations, etc.

Still additionally or alternatively, the set of guidance annotations may provide visual suggestions for completing the current draft estimate, such as: graying out, disabling, or omitting one or more fields to prevent the fields from being modified by the user; highlighting or otherwise providing visual effects to indicate fields that are required (or suggested to) be filled in, modified, or otherwise addressed before addressing other fields (e.g., what the user should do next); etc. Of course, other types of suggestions may additionally or alternatively be included in the set of guidance annotations. For example, for a populated field indicating that a major panel is to be painted, a guidance annotation may inquire whether the user desires adjacent panels to be blended to match the painted major panel. In another example, when the draft estimate indicates that paint is to be sprayed on the vehicle, a guidance annotation may suggest to add a line item for hazardous waste material disposal. In yet another example, a guidance annotation may inquire as to whether a particular type of provider is to perform a particular labor operation, etc.

In some embodiments, the intelligent interceptor engine 410 may determine at least some of the guidance annotations based on a configuration that has been defined a priori, e.g., by system user. For example, the configuration may specify a particular order in which entries, fields, and/or are to be populated; the configuration may present suggestions using enterprise-specific terms, codes, acronyms, etc.; and the like. Additionally or alternatively, the intelligent interceptor engine 410 may determine at least some of the guidance annotations based on one or more analytics techniques. In an embodiment, the intelligent interceptor engine 410 may utilize a model trained on historical vehicle repair data to determine parts and labor. For example, the model may indicate that for a given a part N, parts M and P are typically also utilized for repair at a first confidence level, whereas parts M, P, and Q are typically also utilized for repair at a second confidence level. The model may be tuned based on limits (e.g., related to costs, time, confidence levels, etc.) which may be provided by a system user, for example, and output of the model may be presented as guidance annotations. To continue with the above example, if a system configuration indicates a limit of the first confidence level, the guidance annotations may suggest that the user may want to including parts M and P in the draft estimate (and may not suggest including part Q) given that part N is included in the draft estimate.

As mentioned above, the interactive display of a current draft estimate at the user interface 405 may be a WYSIWYG interactive display. Generally speaking, the interactive display presents a current draft estimate which is able to be directly edited by the user via the user interface 405. Via sets of guidance annotations, the interactive display may intelligently prompt the user to enter and/or change data in an intelligently sequenced set of actions, e.g., in a manner such as described above. As such, the WYSIWIG interactive display visually narrates the process to revise and complete an estimate. Moreover, as described above, for each user modification to a draft estimate (e.g., each key stroke, each user control activation, etc.), the system 400 may automatically execute iterations of the machine loop so that in response to the user modification, an updated draft estimate is automatically presented on the WYSIWYG interactive display in an in-line manner, where the updated draft estimate includes one or more machine-generated modifications to estimate contents based on the user modification, and/or one or more updated guidance annotations corresponding to the user modification. Importantly, the updated draft estimate is presented in an in-line manner on the WYSIWYG display in response to the user modification, e.g., the updated draft estimate is generated and presented at the WYSIWYG display upon the user entering each key stroke, each user control activation, etc. without any delay that is perceptible to the user.

Figure 5:
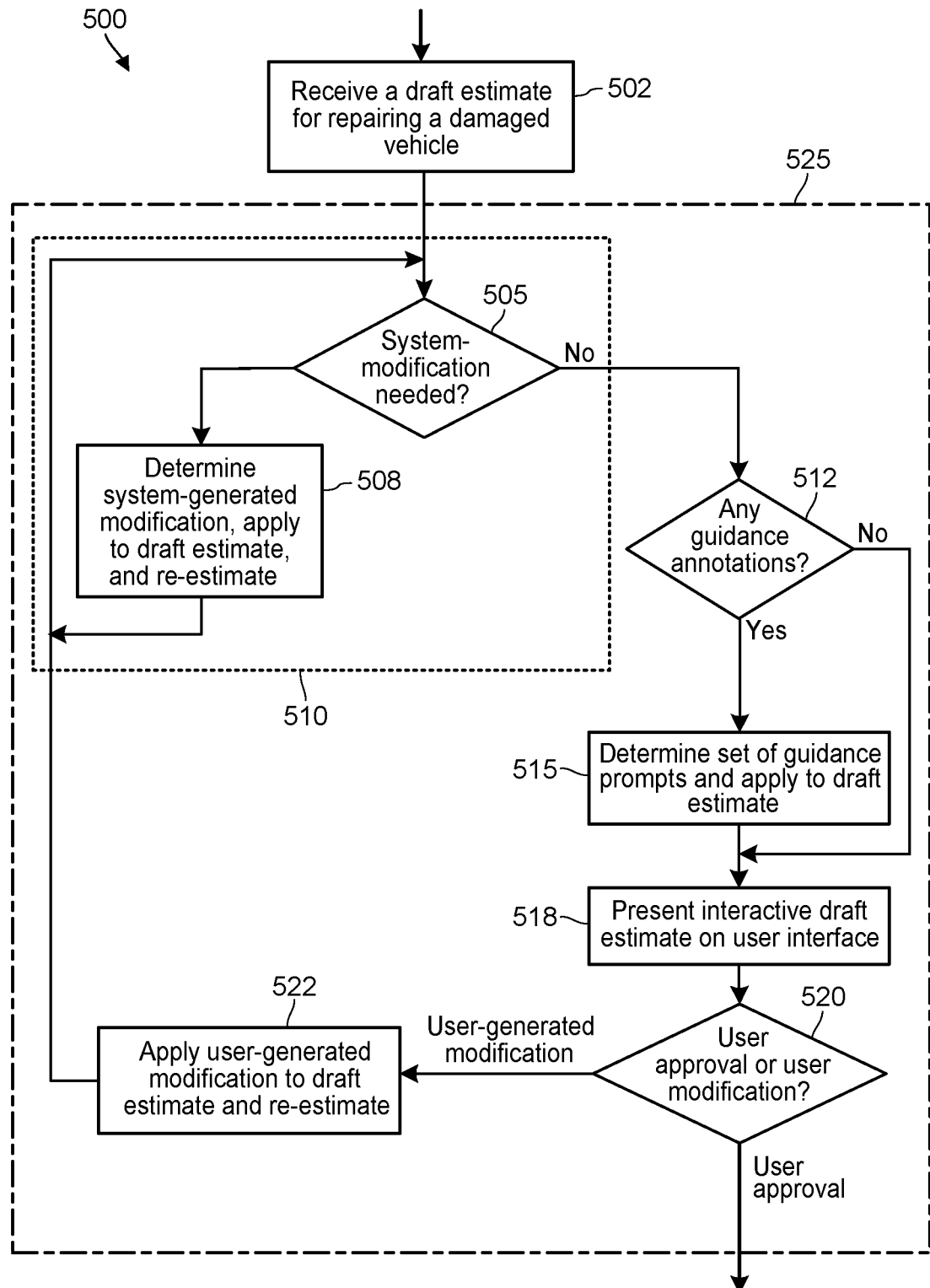
FIG. 5 is flow diagram of an example method of generating vehicle repair estimates.

FIG. 5 is flow diagram of an example method 500 of generating vehicle repair estimates. At least portions of the method 500 may performed by the intelligent estimation system 1, the estimate refinement system 400, or another suitable system. In a preferred embodiment of a plurality of embodiments, only the block 518 of the method 500 is performed in conjunction with human intervention and/or human input; that is, the remainder of the blocks of the method 500 shown in FIG. 5 are performed without any in-line human intervention or human input. In some implementations, the method 500 is performed in conjunction with the method 300, or in conjunction with another method that generates draft vehicle repair estimates. In some embodiments, the method 500 includes additional, less, or alternate functionality than that discussed with respect to FIG. 5, including that discussed elsewhere herein. For illustrative purposes, and not for limitation purposes, the method 500 is discussed with simultaneous reference to FIG. 4.

At block 502, the method 500 includes receiving a draft estimate for repairing a damaged vehicle. For example, the draft vehicle repair estimate may be received at the intelligent interceptor engine 410 of the system 400, or at another engine, module, or application of the system 400 or of another suitable system. The draft vehicle repair estimate may be received, for instance, via a user interface of the receiving system, via a network interface of the receiving system, or from another engine, module, or application of the receiving system. Typically, the received draft estimate includes a set of entries (also referred to interchangeably herein as "line entries"), where each entry of the draft estimate corresponds to a respective part that is predicted, determined, or earmarked for use in repairing the damaged vehicle. For example, each entry may correspond to a respective part or a labor operation related to a respective part. Each entry of the draft estimate may include multiple fields respectively corresponding to, for example, an identity of the respective part or related labor operation, a respective cost or the part or labor operation, a respective time interval corresponding to the part or labor operation (e.g., procurement time, labor time, etc.), an identity of a servicing entity (e.g., repair shop, dealer, etc.), and/or other information related to the respective part. Generally, each entry includes one or more respective fields, and at least some of fields of the entries included in the received draft estimate may be populated with respective values. At least some of the fields of included in the received draft estimate may be unpopulated.

At block 505, the method 500 includes reviewing, by the system without any in-line human input or intervention, the received draft estimate and determining, again by the system without any in-line human input or intervention, if any changes or modifications to the draft estimate are to be automatically performed by the system. For example, at block 505, the method 500 may determine that no changes are to be made to the draft estimate, or that a system-generated modification is to be made to the draft estimate. The determination of whether or not any machine- or system-generated changes are to be made to the draft estimate (and, if so, the particular changes, such as particular modifications and/or particular associations of guidance annotations) may be based on a configuration that was provided a priori, e.g., by a system user; based on one or more analytics routines and/or models; and/or based on other techniques, such as in manners previously described above. In an embodiment, the block 505 is performed by the intelligent interceptor engine 410 of the system 400, or by another engine, module, or application of the system 400 or of another suitable system.

At block 505, when the method 500 determines that a modification to the received draft estimate is to be automatically performed, the method 500 proceeds to the block 508, at which the method 500 includes determining, by the system without any in-line human input or intervention, one or more system-generated modifications and applying the system-generated modification(s) to the draft estimate. The system-generated modification(s) to the received draft estimate typically includes one or more contextual modifications, e.g., one or more modifications to line entries, fields, populated values, and/or unpopulated values of the received draft estimate such as, for example, at least one of: an addition of another field, a removal of an existing field, an population of a value into an empty field, a removal of a value from a populated field, a change to an existing value of a populated field, etc. The system-generated, contextual modification may be determined based on a configuration that was provided a priori, e.g., by a system user; based on one or more analytics routines and/or models generated based on historical vehicle repair data; and/or based on other techniques, such as in manners previously described above. In an embodiment, the block 512 is performed by the intelligent interceptor engine 410 of the system 400, or by another engine, module, or application of the system 400 or of another suitable system.

Additionally, at the block 508, the method 500 includes re-estimating or re-calculating (by the system without any in-line human input or intervention), the contextually-modified draft estimate to thereby generate a system-modified draft estimate that includes both contextual modifications and calculation modifications. As such, the system-modified draft estimate includes both the system-generated contextual modifications (e.g., the updates to entries, fields, and/or populated values of the draft estimate), and also includes system-generated computed or calculated modifications (e.g., line item costs, overall estimated costs, other costs, time intervals, etc. of the draft estimate) that reflect the application of the system-generated contextual modifications to the received draft estimate. In an embodiment, the estimate calculation engine 412 may operate on the contextually-modified draft estimate (which was generated by the intelligent interceptor engine 410) to determine the corresponding calculation modifications and thereby generate the system-modified draft estimate.

Upon generating the system-modified draft estimate at the block 508, the method 500 returns to the block 505, at which the method 500 includes reviewing, by the system without any human input or intervention, the system-modified draft estimate to determine if any (additional) changes to the system-modified draft estimate are to be automatically performed by the method 500.

Generally speaking, the method 500 iteratively executes a loop 510 of the blocks 505-508, where each execution of the blocks 505-508 (e.g., of the loop 510) results in the generation of a current draft estimate via the block 508, where the current draft estimate is a draft estimate that includes all system-generated modifications (both contextual and calculated) that have been incrementally determined and applied to a previous current draft estimate thus far by the iterative executions of the loop 510. The method 500 iteratively executes the blocks 505-508 of the loop 510 until, at the block 505, the method 500 determines that no (additional) changes to the current draft estimate are to be automatically performed, upon which the method 500 proceeds to the block 512. Generally speaking, the loop 510 is executed by the system without any in-line human input or intervention.

At the block 512, the method 500 determines whether or not one or more sets of guidance annotations associated with the draft estimate are to be automatically generated (e.g., are to be generated without any in-line human input or human intervention. The draft estimate for which the one or more sets of guidance annotations are to be automatically generated may be the initially received draft estimate (e.g., the draft estimate associated with block 502), or the draft estimate may be a current draft estimate that includes one or more modifications that have been applied to the initially received draft estimate (e.g., the current draft estimate generated via the block 508).

At the block 512, when guidance annotations are to be generated for the current draft estimate, the method 500 includes generating, without any in-line human input or human intervention, the one or more sets of guidance annotations and associating the generated set(s) of guidance annotations with the draft estimate (block 515). Each guidance annotation may be respectively associated with one or more entries, fields, and/or values (whether populated or unpopulated) of the draft estimate. Additionally or alternatively, at least some of the guidance annotations may be associated with the draft estimate as a whole. The one or more sets of guidance annotations may be generated in a manner similar to that discussed above with respect to FIG. 4, for example. Further, the association of the generated set of guidance annotations with the draft estimate may be implemented in a manner similar to that discussed above with respect to FIG. 4, for example.

Upon automatic generation of the one or more sets of guidance annotations and associating the one or more sets of guidance annotations with the draft estimate (block 515), the method 500 may proceed to block 518, at which the draft estimate and an indication of the one or more sets of guidance annotations are presented on a user interface, such as the user interface 405, for user review and for possible user modification. In some embodiments, the block 518 includes displaying the contents of the draft estimate at the user interface in an interactive format to thereby allow for user modification of the draft estimate via the user interface.

On the other hand, at the block 512, when no guidance annotations are to be generated for the current draft estimate, the method 500 proceeds directly from block 512 to block 518, at which the draft estimate, without any guidance annotations, is displayed on the user interface. The draft estimate may be displayed in an interactive format.

As such, in view of the above discussion, generally the block 518 may include presenting, on the user interface, the contents of a current draft estimate (which may be the initially received draft estimate associated with the block 502, or a system-modified draft estimate generated at the block 508) and optionally an indication of one or more associated sets of guidance annotations. Typically, the presentation is interactive, and therefore includes one or more user controls via which a user may view the guidance annotations (if any) and via which the user may make any desired changes to the displayed current draft estimate. Further, the interactive presentation may include a particular user control via which the user may indicate his or her approval of the displayed current draft estimate.

At block 520, the method 500 includes receiving either a user approval of the presented draft estimate, or a user modification to the presented draft estimate. When, at the block 520, the user indicates approval of the displayed draft estimate, e.g., upon activation of the approval user control via the user interface, the approved vehicle repair estimate may be stored, printed, and/or transmitted for ingestion by another application or system.

On the other hand, at the block 520, the user may indicate a modification to the displayed, current draft estimate via the user interface. The user-generated modification may be a user-generated contextual modification to the current draft estimate such as at least one of: an addition of another field, a removal of an existing field, and population of a value into an empty field, a removal of a value from a populated field, a change to an existing value of a populated field, etc. In some scenarios, the user-generated modification may be a modification to a calculation, such as a cost/price override or adjustment to the current draft estimate.

Upon receiving the user-generated modification at the block 520, the method 500 may proceed to block 522. At the block 522, the method 500 includes applying the user-generated modification to the current draft estimate (e.g., to the current draft estimate that is displayed at the user interface). Additionally, at the block 522, the method 500 includes re-estimating or re-calculating the current draft estimate to which the user-generated modification has been applied to thereby generate a user-modified draft estimate, where the user-modified draft estimate includes a contextual modification and/or a calculation modification. The block 522 may performed, for example, by the user interface 405 of the system 400, by the intelligent interceptor engine 410 of the system 400, or by another engine, module, or application of the system 400 or of another suitable system.

Upon generating the user-modified draft estimate at the block 522, the method 500 returns to the block 505, at which the method 500 includes reviewing, by the system without any in-line human input or intervention, the user-modified draft estimate to determine if any (additional) changes to the user-modified draft estimate are to be automatically performed by the method 500. The method 500 then may operate on the user-modified draft estimate by iteratively executing the loop 510 of the blocks 505-508, in a manner similar to that discussed above for the system-modified draft estimate.

As such, the method 500 includes a smaller loop 510 (which includes the blocks 505-508) that is nested within a larger loop 525 (which includes blocks 510-512-optional 515-518-520-522). That is, for each user-modified draft estimate generated at the block 522, the method 500 automatically operates on the user-modified draft estimate via one or more iterations of the smaller loop 510, which may result in one or more system-modifications being iteratively incorporated into the user-modified draft estimate. When some iteration of the smaller loop 510 indicates, at block 505, that no more system-generated modifications are needed, the method 500 continues executing the larger loop 525 of blocks 510-512-optional 515-518-520-522. The method 500 iteratively executes the larger loop 525 in which the smaller loop 510 is nested until, at the block 520, the user indicates his or her approval of a displayed current draft estimate.

It is noted that at the block 518, the contents of a current draft estimate may be displayed with or without any guidance annotations. However, the user may still make modifications to the current draft estimate as he or she desires, which may or may not be associated with any indicated guidance annotations.

Further, in a preferred (but non-limiting) embodiment, each user modification is individually entered and operated on by the loop 525 of the method 500. To illustrate, in this preferred embodiment, at the block 520, a single user-generated modification is received via the user interface. The method 500 executes the larger loop 525 based on only the single, user-generated modification (which may include multiple iterations of the smaller loop 510), resulting in a display, at the user interface, of the user-modified draft estimate to which any one or more additional system-generated modifications (e.g., as determined by the smaller loop 510) have been applied (block 508). That is, the effect of each user-generated modification is determined and applied by the method 500 incrementally, so that each user-generated modification results in a respective iteration of the larger loop 525. On the other hand, the effect of system-generated modifications may be determined and applied by the method 500 incrementally or in bulk. Thus, at the block 505, the method 500 may determine a single system-generated modification that is operated on by a single iteration of the smaller loop 510, or the method 500 may determine multiple system-generated modifications that are operated on by a single iteration of the smaller loop 510.

In an embodiment, the method 500 omits or excludes the block 515, so that no sets of guidance annotations are generated and displayed. In this embodiment, the method 500 incrementally and iteratively updates an initial draft estimate via both system-generated modifications (block 508) and user-generated modifications (block 522) without generating and providing any guidance annotations for the user.

In another embodiment, the method includes the block 518 but omits or excludes the loop 510. In this embodiment, the method 500 incrementally and iteratively updates an initial draft estimate via user modifications (block 522) aided by guidance annotations (block 518).

FIG. 6 depicts an example embodiment of an intelligent vehicle repair estimation architecture or system 600, which may be utilized in the intelligent vehicle repair estimation system 1 of FIG. 1, the image processing system 10, and/or the estimate refinement system 400. For clarity of illustration, and not for limitation purposes, FIG. 6 is discussed below with simultaneous reference to at least portions of FIGS. 1-5.

As illustrated in FIG. 6, the intelligent vehicle repair estimation architecture or system 600 may include or be in communicative connection with various user interface devices 602A, 602B (which may be computing devices, tablets, smart devices, mobile devices, handheld devices, image capture devices, workstations, holographic headsets or devices, augmented reality headsets or devices, conversational bots, etc.) via one or more communication networks 605 to one or more further computing devices and/or computing systems 608 of the intelligent vehicle repair estimation system 600, where the computing devices and/or computing systems 608 of the system 600 may operate as a computing network of any suitable architecture, e.g., client-server, peer-to-peer, cloud-based, local devices, remote devices, APIs, other types of logical computing systems, etc. In some situations, one or more of the user interface devices 602A are communicatively connected to the system 600 via one or more other networks 606, which may include any number of wired and/or wireless networks, and/or may include any number of public networks (such as the Internet) and/or private networks.

As also illustrated in FIG. 6, the intelligent vehicle repair estimation architecture or system 600 includes one or more databases or data stores 610A, 610B, 610C, 610D, which may be implemented as separate data stores, or may be collectively implemented as an integrated unitary data store, such as a data bank or cloud data storage. For example, data store 610A may be the historical data store 32, data store 610B may be the parts database 37, data store 610C may be the jurisdictional requirements database 40, and data store 610D may be the system database or data store 418. The data stores 610 are communicatively connected to other components of the system 600 via the communication network(s) 605.

Images of damaged vehicles and other input data 5 (e.g., telematics data, incident facts, a vehicle build sheet, sensor data, diagnostics data, telematics data, accident reports, agent and/or law enforcement notes, surveillance camera video, etc.) may be received by the intelligent vehicle repair estimation system 600 via one or more local or remote network interfaces. For example, the user interface devices 602A, 602B may provide images and/or other data related to damaged vehicles to the system 600 for processing, and/or other computing devices and/or systems (not shown in FIG. 6) may provide images and/or other data related to damaged vehicles to the system 600 for processing. The received images and input data 5 may be stored in one or more of the data store(s) 610, if desired.

The computing devices/systems 608 of the system 600 include a one or more computing devices 612 and a one or more computing devices 615 (which, for ease of reading and not for limitation purposes, are referred to herein using the singular tense). The computing device 612 includes one or more processors 618 and one or more tangible, non-transitory computer-readable memories or media 620 storing one or more routines or modules 622 corresponding to image processing, such as those utilized by the image processing component 2 or by the image processing component 10. For example, the one or more routines or modules 622 may include an image processing routine (which, for example, may extract image attributes from sets of images), a parts prediction routine, an estimate generation routine, a context mapping routine, a model generation routine, a model training routine, and/or one or more other routines/modules, which may be included in the parts prediction engine 12 and/or in the estimate generation engine 15 of the image processing system 10, for example. In some embodiments, the memories 620 of the computing device 612 stores a parts prediction model 30, and in other embodiments, the parts prediction model 30 is stored in another database or data store that is accessible to the computing device 612, such as in one of the data stores 610. In an embodiment, the routines or modules 622 comprise respective sets of computer-executable instructions, which are executable by the one or more processors 618 to cause the system 600 to perform various functionality associated with image processing, such as those functions discussed elsewhere in this disclosure, and/or other functions. For example, one of the routines 622 may be a model generation routine that operates on the historical data associated with repairing vehicles 610a to thereby generate a parts prediction model, and/or other models that are utilized by the image processing component 2 or the image processing component 10. In another example, one of the routines 622 may be a context mapping module 35 that predicts jurisdictionally-based sets of repairs (e.g., parts, labor operations, time intervals, costs, etc.) based on a set of universal keys.

The computing device 615 includes one or more processors 628 and one or more tangible, non-transitory computer-readable memories or media 630 storing one or more routines, modules, or engines 632 corresponding to vehicle repair estimate refinement, such as those utilized by the estimate refinement component 3 or by the estimate refinement component 400. For example, the one or more routines, models or engines, 632 may include the user interface 405 corresponding to humans viewing, modifying, and refining draft vehicle repair estimates, the intelligent interceptor engine 410, and/or the estimate calculation engine 412 of the estimation generation engine 400, for example. In an embodiment, the routine, modules, or engines 632 comprise respective sets of computer-executable instructions, which are executable by the one or more processors 628 to cause the system 600 to perform various functionality associated with intelligent vehicle repair estimation, such as those functions discussed elsewhere in this disclosure, and/or other functions. For example, one of the routines 632 may be a machine loop that automatically determines and applies modifications to a draft estimate (e.g., in an iterative and/or incremental manner), and one of the routines 632 may be a human-machine loop that builds upon a machine-modified draft estimate by incorporating human-generated modifications.

While it will be understood that the intelligent vehicle repair estimation system 600 of FIG. 6 is illustrated as a hardwired system having various servers 608 and databases 610 connected to various user interfaces 602 via a hardwired communication network 605, other processing and communication configurations could be used as well or instead. For example, the network 605 could be a wireless communication network, or could be a combined wired and wireless communication network, and the network 605 may include any type of communication network, including a public local area network (LAN) or wide area network (WAN), a private LAN or WAN, a set of direct communication connections, etc. Moreover, the network 605 may include or use the Internet or the World Wide Web, to enable users at the user interfaces 602A and 602B to communicate with the servers 608 and databases 610 via an Internet connection to upload photos or images of a damaged vehicle, to initiate the execution of at least portions of the routines 622, 632, to view the results of the routines 622, 632, to adjust parameters associated with the routines 622, 632, to provide user modifications to draft estimates, etc. Still further, while the servers 608 and databases 610 are illustrated in FIG. 6 as including six different devices that have different information stored therein, any number of servers, databases, and/or other computing devices could be used and, in fact, the elements illustrated in the servers 608 and databases 610 of FIG. 6 could be stored within or distributed among more or less than six devices. For example, these components could be all stored in the same computer processing device, which could be the same computer processing device as one of the user interfaces 602A or 602B. In another example, at least some (or all) of these components could be implemented using a computing cloud architecture. Thus, the architecture of the intelligent vehicle repair estimation system 600 FIG. 6 could be changed to include more or less computer devices connected in various different manners and still function as described herein.

Thus, in view of the above, the novel and non-obvious systems, methods, and techniques described herein for intelligent vehicle estimation provide numerous benefits and advantages over currently known computer-assisted electronic estimation templates or forms. For example, as demonstrated in a comparison of a test prototype that incorporated at least some of the above described techniques with known computer-assisted electronic estimation forms, the test prototype resulted in significant decreases in the number of user clicks, the number of user keystrokes, and the number of user interactions that were needed to complete a vehicle repair estimate, thereby significantly decreasing the time required to finalize a vehicle repair estimate. Further, the accuracy of the finalized vehicle repair estimate was significantly increased over that provided by known, computer-assisted electronic estimation templates or forms.

The following additional considerations apply to the foregoing discussion. Throughout this specification, plural instances may implement components, operations, or structures described as a single instance. Although individual operations of one or more routines or methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, engines, or mechanisms or units. Any of these modules, units, components, etc. may constitute software modules (e.g., code stored on a non-transitory machine-readable medium), firmware modules, or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the hardware terms used herein should be understood to encompass tangible entities, be that entities that are physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time.

Hardware, firmware, and software modules or routines can provide information to, and receive information from, other hardware, firmware, and/or software modules and routines. Accordingly, the described modules may be regarded as being communicatively coupled. Where multiple of such hardware, firmware, and/or software modules exist contemporaneously, communications may be achieved through signal transmission (e.g., over appropriate circuits, lines and buses) that communicatively connect the modules. In embodiments in which multiple hardware, firmware, and/or software modules are configured or instantiated at different times, communications between such modules may be achieved, for example, through the storage and retrieval of information in memory structures to which the multiple modules have access. For example, one hardware, firmware, or software module may perform an operation and store the output of that operation in a memory device to which it is communicatively coupled. A further hardware, firmware, or software module may then, at a later time, access the memory device to retrieve and process the stored output. Hardware, firmware, and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a plant environment, an office environment or as a server farm), while in other embodiments the processors may be distributed across a number of locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "application," an "algorithm" or a "routine" is a self-consistent sequence of operations or similar processing leading to a desired result. In this context, applications, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs may be used for implementing an image processing application and system for configuring and executing the change detection techniques disclosed herein. Thus, while particular embodiments and applications have been illustrated and described herein, it is to be understood that the disclosed embodiments are not limited to the precise construction and components disclosed herein. Various modifications, changes and variations, which will be apparent to those skilled in the art, may be made in the arrangement, operation and details of the methods and structure disclosed herein without departing from the spirit and scope defined in the claims.

What is claimed:

1. A system, comprising:
   an intelligent interceptor engine coupled to a user interface, the intelligent interceptor engine comprising one or more memories storing computer-executable instructions that, when executed by one or more processors of the system, cause the intelligent interceptor engine to:
   (a) train a machine learning model to determine, for a first vehicle part needed to repair damaged vehicles, at least one of a second vehicle part or a labor operation that is more closely correlated to repairing damaged vehicles by using the first vehicle part as compared to other at least one of vehicle parts or labor operations, the training based on historical data associated with repairing a plurality of damaged vehicles, and the historical data indicating, for each damaged vehicle of the plurality of damaged vehicles, a respective set of vehicle parts and a respective set of historical labor operations that were used to repair the each damaged vehicle;

(b) obtain an initial draft estimate for repairing a damaged vehicle, the initial draft estimate including a set of fields, each field included in the set of fields corresponding to a respective part or labor operation associated with repairing the damaged vehicle;

(c) execute one or more iterations of an automated loop with respect to the initial draft estimate, each iteration of the automated loop including:

analyzing, by utilizing the trained machine learning model, a current draft estimate to determine, for at least one part indicated in the current draft estimate, whether or not any system-generated modifications are to be made to the current draft estimate, the any system-generated modifications including at least one of an addition of a field corresponding to another part or an addition of a field corresponding to another labor operation to the current draft estimate; and when at least one system-generated modification is to be made to the current draft estimate, applying the at least one system-generated modification to the current draft estimate and causing one or more values of the current draft estimate to be updated based on the applied at least one system-generated modification, thereby updating the current draft estimate, and subsequently initiating a next iteration of the automated loop with respect to the updated current draft estimate;

(d) when the automated loop determines that no additional system-generated modifications are to be made to the current draft estimate, display the current system-modified draft estimate at the user interface;

(e) obtain, via the user interface, a user-generated modification in response to the display of the current system-modified draft estimate; and (f) apply the user-generated modification to the current system modified draft estimate, thereby generating a user-modified draft estimate, and subsequently initiating another iteration of the automated loop with respect to the user-modified draft estimate.

2. The system of claim 1, wherein the at least one system-generated modification applied to the current draft estimate further includes at least one of: an addition of another field, a removal of an existing field, an addition of a value into an empty field, or a change to an existing value of a populated field.

3. The system of claim 1, wherein when no additional system-generated modifications are to be made to the current draft estimate:

the intelligent interceptor engine annotates one or more fields of the current draft estimate with one or more respective guidances for revising the current draft estimate; and the current system-modified draft estimate is displayed at the user interface in conjunction with one or more indications of the one or more respective guidance annotations.

4. The system of claim 3, wherein at least one of the one or more indications of the one or more respective guidance annotations includes a respective user control, and the user-generated modification includes a respective activation of the respective user control via the user interface.

5. The system of claim 3, wherein a particular field is included in the current draft estimate, and an annotated guidance associated with the particular field is one of:

a first guidance annotation indicating a first group of modifications related to the particular field, wherein an activation of a user control corresponding to the first guidance annotation results in the system applying an entirety of the first group of modifications related to the particular field;

a second guidance annotation indicating a second group of modifications related to the particular field for user selection, wherein an activation of a user control corresponding to the second guidance annotation indicates a user selection of a subset of the second group of modifications and results in the system applying the subset of the second group of modifications related to the particular field; or a third guidance annotation indicating one or more other fields or information related to at least one of modifying the particular field or modifying other fields of the current system-modified draft estimate.

6. The system of claim 3, wherein at least some of the one or more respective guidance annotations are generated by the system based on a configuration.

7. The system of claim 1, wherein values included in the current system-modified draft estimate include an overall estimated cost associated with repairing the damaged vehicle and at least one of: part costs, labor operation costs, labor operation times, overlap times, included times, a refinish time, or a respective maximum cost associated with a respective one or more fields.

8. The system of claim 1, wherein the initial draft estimate is obtained by the intelligent interceptor engine from an image processing system that operated on a set of images of the damaged vehicle to thereby generate the initial draft estimate.

9. A method, comprising:

(a) training, by an intelligent interceptor engine, a machine learning model to determine, for a first vehicle part needed to repair damaged vehicles, at least one of a second vehicle part or a labor operation that is more closely correlated to repairing damaged vehicles by using the first vehicle part as compared to other at least one of vehicle parts or labor operations, the training based on historical data associated with repairing a plurality of damaged vehicles, and the historical data indicating, for each damaged vehicle of the plurality of damaged vehicles, a respective set of vehicle parts and a respective set of historical labor operations that were used to repair the each damaged vehicle;

(b) receiving, at the intelligent interceptor engine, an initial draft estimate for repairing a damaged vehicle, the initial draft estimate including a set of fields, and each field included in the set of fields corresponding to a respective part or labor operation;

(c) executing one or more iterations of an automated loop with respect to the initial draft estimate, each iteration of the automated loop including:

analyzing, by utilizing the trained machine learning model, a current draft estimate to determine, for at least one part indicated in the current draft estimate, whether or not any system-generated modifications are to be made to the current draft estimate, the any system-generated modifications including at least one of an addition of a field corresponding to another part or an addition of a field corresponding to another labor operation to the current draft estimate; and when at least one system-generated modification is to be made to the current draft estimate, applying the at least one system-generated modification to the current draft estimate and causing one or more values of the current draft estimate to be updated based on the applied at least one system-generated modification, thereby updating the current draft estimate, and subsequently initiating a next iteration of the automated loop with respect to the updated current draft estimate;

(d) when the automated loop determines that no additional system-generated modifications are to be made to the current draft estimate, presenting the current system-modified draft estimate at the user interface;

(e) obtaining, via the user interface, a user-generated modification in response to the display of the current system-modified draft estimate; and (f) applying the user-generated modification to the current system modified draft estimate, thereby generating a user-modified draft estimate, and subsequently initiating another iteration of the automated loop with respect to the user-modified draft estimate.

10. The method of claim 9, wherein applying the at least one system-generated modification to the current draft estimate further includes at least one of: adding another field, removing an existing field, adding a value into an empty field, or changing an existing value of a populated field.

11. The method of claim 9, wherein when the automated loop determines that no additional system-generated modifications are to be made to the current draft estimate, the method further includes:

annotating one or more fields of the current draft estimate with one or more respective guidances for revising the current draft estimate; and presenting the current system-modified draft estimate at the user interface in conjunction with one or more indications of the one or more respective guidance annotations.

12. The method of claim 11, further comprising determining at least some of the one or more respective guidance annotations based on a configuration.

13. The method of claim 11, wherein presenting the one or more indications of the one or more respective guidance annotations comprises presenting at least one of:

a single-click guidance annotation that indicates a first group of modifications and applies an entirety of the first group of modifications to the current system-modified draft estimate upon a single activation of a user control corresponding to the single-click guidance annotation;

an interactive guidance annotation that indicates a second group of modifications and applies only user-selected modifications of the second group of modifications to the current system-modified draft estimate; or an informative guidance annotation that indicates other information corresponding to revising the current system-modified draft estimate.

14. The method of claim 9, wherein the user-generated modification is included in a plurality of user-generated modifications received over time via the user interface, and the method further comprises:

upon a respective reception of each user-generated modification of the plurality of user-generated modifications:

applying the each user-generated modification to a respective displayed draft estimate, thereby generating a respective user-modified draft estimate; and initiating a respective subsequent iteration of the automated loop with respect to the respective user-modified draft estimate.

15. The method of claim 9, wherein values included in the current system-modified draft estimate include an overall estimated cost associated with repairing the damaged vehicle and at least one of: part costs, labor operation costs, labor operation times, overlap times, included times, a refinish time, or a respective maximum cost associated with a respective one or more fields.

16. The method of claim 9, wherein receiving the initial draft estimate for repairing the damaged vehicle comprises receiving a particular draft estimate generated by an image processing system via operating on a set of images of the damaged vehicle to thereby automatically generate the particular draft estimate.

17. A method, comprising:

at a system including a user interface, an estimate calculation engine, and an intelligent interceptor engine, each of which comprises respective computer-executable instructions stored on one or more tangible, non-transitory computer-readable media and executable by one or more processors:

(a) training, by the intelligent interceptor engine, a machine learning model to determine, for a first vehicle part needed to repair damaged vehicles, at least one of a second vehicle part or a labor operation that is more closely correlated to repairing damaged vehicles by using the first vehicle part as compared to other at least one of vehicle parts or labor operations, the training based on historical data associated with repairing a plurality of damaged vehicles, and the historical data indicating, for each damaged vehicle of the plurality of damaged vehicles, a respective set of vehicle parts and a respective set of historical labor operations that were used to repair the each damaged vehicle;

(b) analyzing, by the intelligent interceptor engine and by utilizing the trained machine learning model, a draft estimate to determine, for at least one part indicated in the current draft estimate, whether or not any system-generated modifications are to be made to the draft estimate, the any system-generated modifications including at least one of an addition of a field corresponding to another part or an addition of a field corresponding to another labor operation to the current draft estimate;

(c) when at least one system-generated modification is to be made to the draft estimate determining, by the intelligent interceptor engine, the at least one system-generated modification, and applying the at least one system-generated modification to the draft estimate;

(d) updating, by the estimate calculation engine, respective values of one or more fields included in the draft estimate to which the at least one system-generated modification has been applied, thereby generating a system-modified draft estimate, and initiating (a) with respect to the system-modified draft estimate;

(e) when no additional system-generated modifications are to be made to a current system-modified draft estimate, present, by the intelligent interceptor engine, the current system-modified draft estimate at a user interface.

18. The method of claim 17, further comprising:

in response to the presentation of the current system-modified draft estimate at the user interface, receiving, via the user interface, a user-generated modification to the system-modified draft estimate;

applying the user-generated modification to the system-modified draft estimate;

updating, by the estimate calculation engine, respective values of one or more fields included in the system-modified draft estimate to which the user-generated modification has been applied, thereby generating a user-modified draft estimate; and initiating (a) with respect to the user-modified draft estimate.

19. The method of claim 18, wherein when no additional system-generated modifications are to be made to the current system-modified draft estimate, the method further includes:

generating, by the intelligent interceptor engine, one or more guidances associated with a particular field of the current system-modified draft estimate;

annotating the particular field with an indication of the one or more guidances; and presenting the indication of the one or more guidance annotations in conjunction with the current system-modified draft estimate at the user interface.

20. The method of claim 19, wherein the user-generated modification corresponds to the one or more guidance annotations.

21. The method of claim 19, wherein the one or more guidance annotations include at least one of:

a suggestion to modify an existing value of the particular field or of an associated field of the current system-modified draft estimate;

a list of one or more selectable values for population into the particular field or into an associated field of the current system-modified draft estimate;

an indication of a disabling one or more fields of the current system-modified draft estimate from being modified via the user interface;

a link to another field of the current system-modified draft estimate;

a suggestion to add an additional field to the current system-modified draft estimate;

a suggestion to remove an existing field of the current system-modified draft estimate;

a single-click guidance annotation that indicates a first group of modifications and applies an entirety of the first group of modifications to the current system-modified draft estimate upon a single activation of a user control corresponding to the single-click guidance annotation;

an interactive guidance annotation that indicates a second group of modifications and applies only user-selected modifications of the second group of modifications to the current system-modified draft estimate; or an informative guidance annotation that indicates other information corresponding to revising the current system-modified draft estimate.

22. The method of claim 18, wherein the user-generated modification is included in a plurality of user-generated modifications received over time via the user interface, and the method further comprises:

upon a respective reception of each user-generated modification of the plurality of user-generated modifications:

applying the each user-generated modification to a respective displayed draft estimate, thereby generating a respective user-modified draft estimate; and initiating (a) with respect to the respective user-modified draft estimate.

* * * * *